(12) United States Patent
Ishimoto

(10) Patent No.: US 7,242,501 B2
(45) Date of Patent: Jul. 10, 2007

(54) PRINTING INFORMATION PROCESSING DEVICE, PRINTING DEVICE, PRINTING INFORMATION PROCESSING METHOD AND PRINTING SYSTEM

(75) Inventor: Koichi Ishimoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 386 days.

(21) Appl. No.: 11/062,005

(22) Filed: Feb. 18, 2005

(65) Prior Publication Data
US 2005/0190236 A1  Sep. 1, 2005

(30) Foreign Application Priority Data
Feb. 27, 2004  (JP) ............... 2004-055370

(51) Int. Cl.
*H04N 1/40*  (2006.01)
(52) U.S. Cl. ............... 358/2.1; 358/3.24; 358/504
(58) Field of Classification Search ............... 358/1.9, 358/2.1, 3.23–3.24, 3.09–3.1, 504, 523, 530, 358/534; 347/40, 43
See application file for complete search history.

(56) References Cited

U.S. PATENT DOCUMENTS

| | | | | |
|---|---|---|---|---|
| 6,391,388 | B1* | 5/2002 | Hilgenfeld et al. | 427/279 |
| 6,655,784 | B2* | 12/2003 | Kakutani | 347/43 |
| 6,962,404 | B2* | 11/2005 | Nunokawa et al. | 347/43 |
| 2003/0072022 | A1* | 4/2003 | Someno | 358/1.13 |
| 2004/0035320 | A1* | 2/2004 | Sano et al. | 106/31.6 |

FOREIGN PATENT DOCUMENTS

| | | | |
|---|---|---|---|
| JP | 10-44472 A | | 2/1998 |
| JP | 10-044472 A | | 2/1998 |
| JP | 10200763 A | * | 7/1998 |
| JP | 10-226139 A | | 8/1998 |
| JP | 2001-290319 A | | 10/2001 |
| JP | 2004-013311 A | | 1/2004 |
| KR | 1994-18221 | | 8/1994 |

* cited by examiner

*Primary Examiner*—Thomas D. Lee
*Assistant Examiner*—Stephen Brinich

(57) ABSTRACT

In a printing process, an image quality identifier is referred to in a packet header of image data. It is determined whether the image quality identifier is '1' or '0', and when the image quality identifier is '1' indicating a high-quality image, six color printing is set. When the image quality identifier is '0' indicating a low-quality image, four color printing is set. Thus, six color printing is executed for an image read out by a scanner in the CCD technique while four color printing is executed for an image read out by a scanner in the CIS technique. Accordingly, it can be determined according to a simple standard such as kind of scanner.

15 Claims, 13 Drawing Sheets

PRINTING INFORMATION PROCESSING DEVICE, PRINTING DEVICE, PRINTING INFORMATION PROCESSING METHOD AND PRINTING SYSTEM

BACKGROUND OF THE INVENTION

1. Field of the Invention

The present invention relates to a printing information processing device, printing device, printing information processing method and printing system.

Hitherto, in the past, in order to carry out high-quality color printing, a printer that can carry out printing using six colors of light cyan (Lc) and light magenta (Lm), which have the property with the same hue as cyan and magenta and lower concentration, in addition to four colors of cyan (C), magenta (M), yellow (Y) and black (K) is known for recording media such as toner and inks. For such a printing device, a manner is known for printing selecting, for example, a mode of using six colors of C, M, Y, K, Lc and Lm and a mode of using four colors of C, M, Y and K as modes with different number of kinds of recording media to be used.

For example, when printing character images, it is often that the image quality in using four color recording media of C, M, Y and K and that in using six color recording media of Lc and Lm added with former four media do not exhibit large difference from each other. Accordingly, in such printing, by carrying out four color printing, unnecessary use of the recording media of Lc and Lm can be restrained. When carrying out printing of gradient images such as photograph images, by carrying out six color printing, higher image quality printing can be attained.

As a structure for selecting such sets of four color recording media or six color recording media, it is known that a user sets the four color recording mode or the six color recording mode according to the image to be printed via an operation panel, etc. It is also known to discriminate the kind of image to be printed and to make selection on the basis of the discrimination when the plurality of modes with different using manners for the recording media are switched. As for the discriminating method, a method is known for discriminating the kind of image by checking the concentration distribution of image data and the concentration difference between adjoining dots.

However, the above-mentioned discriminating method requires some discriminating processes such as checking of the concentration distribution for the image data. Accordingly, when switching the set of recording media using the discriminating method, the processing load and processing time would be increased due to the discriminating process.

The quality of images to be printed might not be realized up to the level of using, for example, the above-mentioned six color recording media for the gradient images such as photograph images. This is because the expressing ability of the image data might not match six color printing. For example, when printing images picked up by a scanner are printed, the image data picked up by the CCD-technique (charge-coupled device technique) scanner has small noises and exhibits good color reproducibility, and as a result, it is suitable for six color printing as high quality printing. On the other hand, the image data picked up by the CIS-technique scanner has large noises and exhibits poor color reproducibility compared to that picked up by the CCD-technique scanner. Accordingly, even though the image data picked up by the CIS-technique (contact image sensor technique) is printed out in six colors, the image quality would be as low as that of four color printing. Some of the languages for describing the image data might be used for expressing sufficiently high quality images by six color printing, while others languages may not be so used. For example, as for PostScript of Adobe Inc., varieties of software are prepared for adjusting color reproducibility such as color calibration. Also, the profiles (data for describing the printer properties) for PostScript matching printers are prepared by manufactures of the printers. Furthermore, the variety of software for creating profiles is prepared, and thus the color reproducibility is in good environment compared to other languages. For example, in carrying out printing in six colors by a printer, if the profile for PostScript is prepared while that for other languages is not prepared, the image data described in a language other than PostScript would not be suitable to high quality six color printing.

Such image input equipment or data description language would often be selected according to the quality of images to be printed. In particular, in the printing environment where various kinds of equipment are connected via a network, it would be easy to select and use the image input equipment or data description language according to the quality of images to be printed.

SUMMARY OF THE INVENTION

The present invention is to solve the above-mentioned problems, and it provides a printing information processing device, printing device, printing information processing method and printing system, capable of setting a mode suitable to the images to be printed by simple discrimination and to carry out printing according to the discrimination when the plurality of modes with different numbers of types of recording media to be used are switched for carrying out printing.

Accordingly, an aspect of the present invention is a printing information processing device for creating printing information to be supplied to a printing device carrying out printing for every set of a plurality of recording agents with different combinations of the contained recording agents based on printing information using the set includes an identification information setting means for setting identification information corresponding to a property which is of image data included in the printing information, the identification information being in the printing information and used by the printing device to determine print quality.

Another aspect of the present invention is a printing device carrying out printing for every set of the plurality of recording agents on the basis of the printing information using the set of the plurality of recording agents with different combinations of included recording agents includes a printing control means referring to the identification information corresponding to the property which is of image data included in the printing information, the identification information being used by the printing device to determine print quality, and carrying out printing using one of the plurality of sets of recording agents corresponding to the contents of the identification information.

Yet another aspect of the present invention is a printing information processing method for creating printing information to be supplied to a printing device carrying out printing for every set of a plurality of recording agents with different combinations of the contained recording agents on the basis of the printing information using the set and for controlling printing of the printing device. The method has a step for setting identification information corresponding to the property which is of image data included in the printing information, the identification information being in the printing information and being used by the printing device to determine print quality.

The printing information processing method further has a step for referring to the identification information in the printing information and for controlling to carry out printing using one of the plurality of sets of recording agents corresponding to the contents of the identification information.

Furthermore, according to another aspect of the present invention, a printing system includes a printing device carrying out printing for every set of a plurality of recording agents with different combinations of the contained recording agents based on printing information using the set and a printing information processing device for creating the printing information to be supplied via a network and for controlling printing of the printing device, the printing information processing setting the identification information corresponding to a property which is of image data included in the printing information, the image identification being in the printing information and being used to determine print quality, the printing device referring to the identification information included in the printing information and carrying out printing using one of the plurality of sets of recording agents corresponding to the contents of the identification information.

Further functions, characteristics, features and advantages of the present invention will become apparent from the following description of exemplary embodiments (with reference to the attached drawings).

DESCRIPTION OF THE EMBODIMENTS

In the following, exemplary embodiments of the present invention are described in detail referring to the accompanying drawings.

Figure 1:
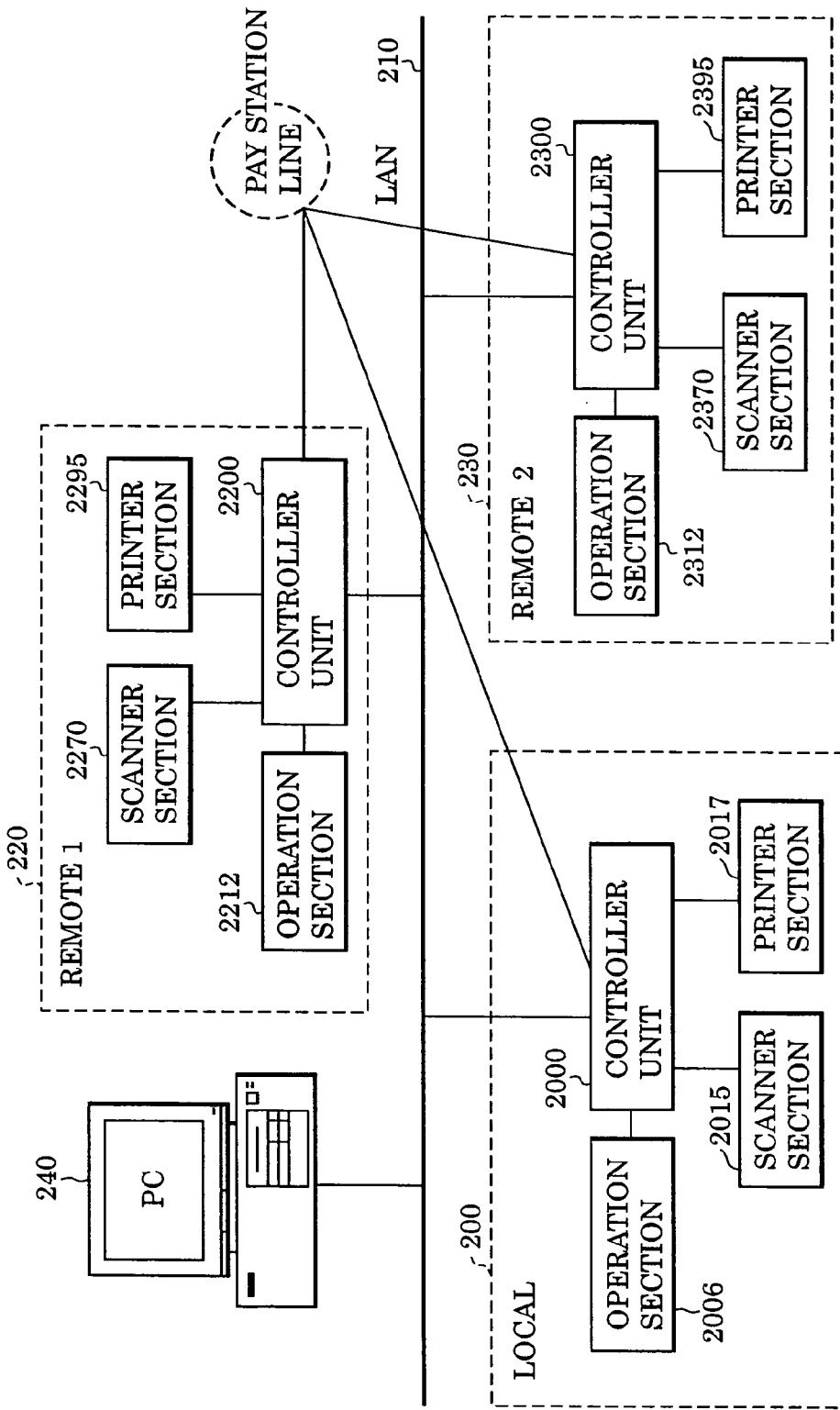
FIG. 1 is a block diagram illustrating the structure of a printing system regarding one embodiment according to the present invention.

FIG. 1 is a block diagram illustrating the structure of a printing system regarding one embodiment according to the present invention.

In the printing system of this embodiment, printers 200, 220, 230 and a personal computer (PC) 240 are connected via a network. The printers 200, 220, 230 are multifunctional printing devices having a plurality of functions such as copying, printing, etc. Equipment connected to the network is not necessarily limited to the above mentioned examples. For example, it is apparent from the following descriptions that various kinds of embodiments, described later, of the present invention can be realized by connecting widely-known equipment such as a conventional printer solely having printing function to the network and by constituting the printing system.

In this system, printing information created in the PC 240 can be transferred to any printer selected from the printers 200, 220, 230 connected to the network for carrying out printing. Any of the printers 200, 220, 230 can print out images having read by their own scanner by the printer section (hereinafter, local copy) and transfer the images to other printers and carry out printing by the other printer section (hereinafter, remote copy).

In the following, a case in which documents are read out by a scanner section 2015 of the printer 200 (in this case, the printer 200 is a local printer) and printed out by the printer section 2017 of the printer 200 (local copy) or a case in which the read out image data is transferred to the printer 220 or the printer 230 and printed out by the printer section of either one of them (remote copy) (in this case, the printers 220, 230 are both remote printers 1, 2) is used as an example and described below.

The local printer 200 consists of the scanner section 2015 as an image input device, the printer section 2017 as an image output device, a controller unit 2000, and an operation section 2006 as a user interface. The scanner section 2015, the printer section 2017 and the operation section 2006 are respectively connected to the controller unit 2000 via a system bus, etc., and the controller unit 2000 can control the scanner section 2015, the printer section 2017, etc. On the other hand, the controller unit 2000 is connected to a network transfer means such as a local area network (LAN) 210 or a pay station line. Thus, the local printer 200 can transmit the image data to the other printers and carry out printing by the other printers. The pay station line enables transmission by G3, G4 fax including color image transmission. The printers 220, 230 having similar equipment structure as the printer 200 are connected to the LAN 210. The PC 240 is also connected to the LAN 210. And a file or an electronic mail can be transmitted/received using a protocol, such as file transfer protocol (FTP) or server message block (SMB), and the printing information can be transferred from the PC 240 to the respective printers for printing.

The remote printers 220, 230 have similar structures as the local printer 200 and include scanner sections 2270, 2370, printer sections 2295, 2395 and operation sections 2212, 2312, respectively, which are controlled by controller units 2200, 2300, respectively. Thus, the respective remote printers 220, 230 can carry out printing on the basis of the image data transmitted from the local printer 200.

Figure 2:
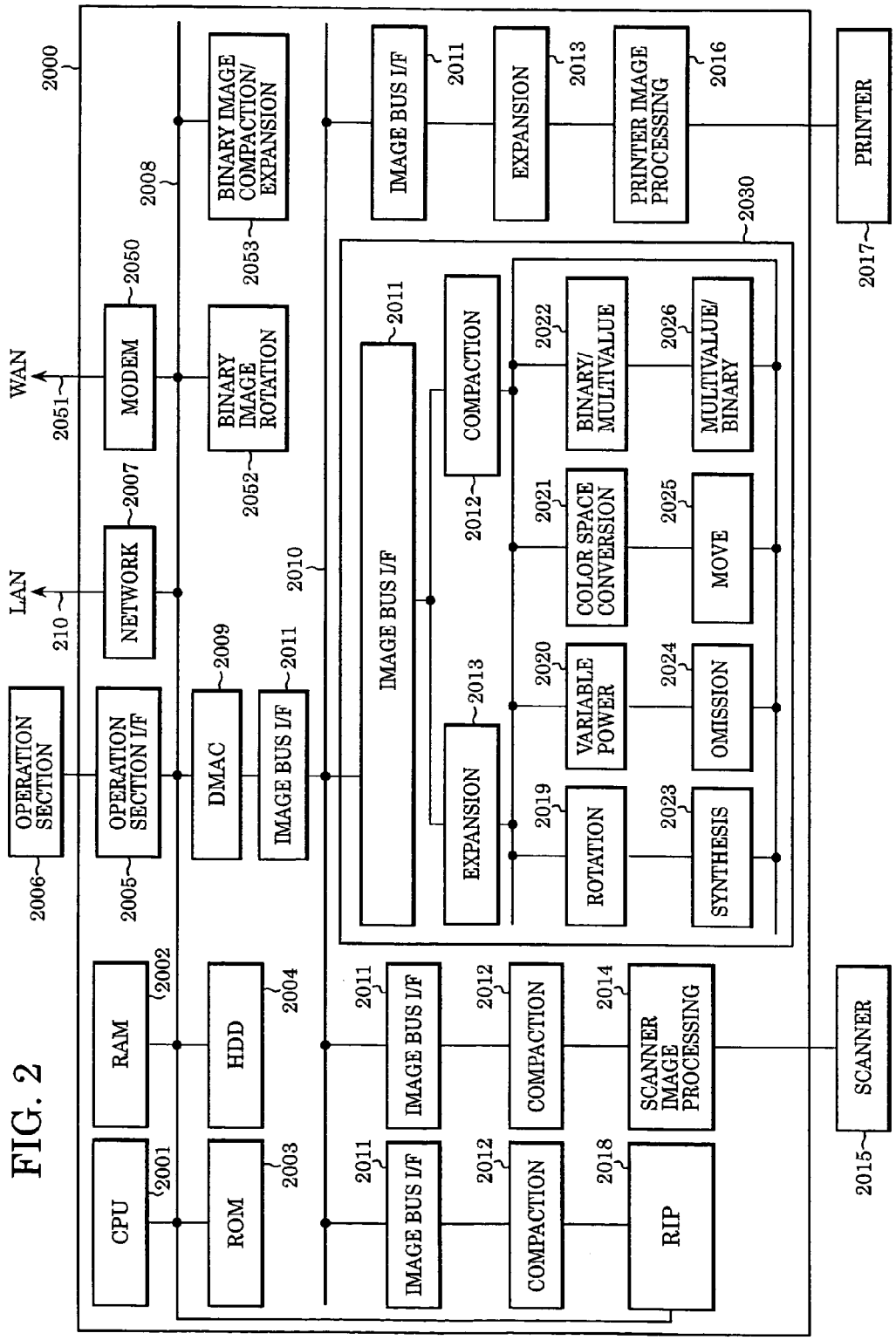
FIG. 2 is a block diagram illustrating the detailed structure of, in particular a controller unit 2000 of a printer 200 shown in FIG. 1.

FIG. 2 is a block diagram illustrating the detailed structure of, in particular a controller unit 2000 of a printer 200. In the present example, printers 220, 230 have the same structure as above. The controller unit 2000, as described above, connects a color scanner 2015 and a color printer 2017 via a system bus, etc. while it is connected to LAN 210 or a pay station line wide area network (WAN) 2051. Thus, in this printing system, printing information or device information is input/output.

In the controller 2000 shown in FIG. 2, a central processing unit (CPU) 2001 controls the units of the controller 2000. Random-access memory (RAM) 2002 is a system work memory for operating the CPU 2001 and it also serves as an image memory for temporarily storing image data. Read-only memory (ROM) 2003 is a boot ROM, and a boot program of the system is stored therein. HDD (hard disc drive) 2004 stores system software, image data, etc.

An operation section interface (I/F) 2005 is an interface to an operation section (user interface) (UI) 2006 and carries out processing for outputting to the operation section 2006 the image data to be displayed on the operation section 2006 and for transmitting the information input by a user to the CPU 2001 via the operation section 2006. A network 2007 is connected to the LAN 210 and inputs/outputs printing information between this printer and other equipment such as the local printer. A modem 2050 is connected to the pay station line 2051 and inputs/outputs printing information between this printer and other equipment. Binary Image Rotation 2052 and Binary Image Compaction/Expansion 2053 is for converting the respective image direction before transmitting binary images by the modem 2050 and converting the images so as to match predetermined resolution or the counterpart's ability. The Compaction/Expansion 2053 supports various coding formats, for example JBIG (Joint Bi-Level Image Experts Group), MMR (Modified Modified Read), MR (Modified Read) and MH (Modified Huffman). DMAC (direct memory access (DMA) controller) 2009 reads out the images stored in the RAM 2002 without control of the CPU 2001 and transfers the images to an image bus I/F 2011 or writes the images on an image bus on the RAM 2002 without control of the CPU 2001. The above elements are respectively connected with each other via the system bus 2008. The image bus I/F 2011 is an interface for controlling high-speed inputting/outputting of images via an image bus 2010. Compaction 2012 is a compressor for JPEG-compacting (Joint Photographic Experts Group compacting) of the images in the unit of 32 pixels×32 pixels before delivering the images to the image bus 2010. Expansion 2013 is an expander for expanding the images transmitted via the image bus 2010.

A raster image processor (RIP) 2018 receives PDL (page description language) code from a host computer via the network 2007. CPU 2001 stores the received PDL code in the RAM 2002 via the system bus 2008. CPU 2001 converts the PDL code into a middle code and transmits it to the RIP 2018 via the system bus 2008. The RIP 2018 deploys a bitmap image (multivalue) on the basis of the middle code.

Scanner Image Processing 2014 carries out various kinds of proper image processing (for example, correcting, processing, editing) for color images or black-and-white images input from the scanner section 2015 and outputs multivalue data of the processing result. Similarly, Printer Image Processing 2016 carries out various kinds of proper image processing (for example, correcting, processing, editing) regarding the printer section 2017. When carrying out printing by the printer section 2017, Expansion 2013 carries out binary multivalue conversion and Printer Image Processing 2016 carries out binary output or multivalue output for it.

An image conversion section 2030 carries out predetermined image conversion for the image data stored in the RAM 2002 and stores the data in the RAM 2002. The image conversion section 2030 has various kinds of conversion functions for converting images. Rotation 2019 can rotate the images in the unit of 32 pixels×32 pixels by a specified angle and corresponds to binary or multivalue input/output. Variable Power 2020 has functions for carrying out conversion of image resolution (for example, from 600 dpi to 200 dpi) and for magnifying the image (for example, 25% to 400%). Before magnifying, the image in 32 pixels×32 pixels is realigned into an image in the unit of 32 lines. Color Space Conversion 2021 converts the images input in multivalue using a matrix operation or LUT (look-up table), for example from a YUV (Luminance-Bandwidth-Chrominance) image into a Lab image. Color Space Conversion 2021 has a 3×8 matrix operation and one-dimension LUT and can prevent widely-known foundation skip or rear side printing by processing with the operation and the LUT. The images converted by Color Space Conversion 2021 are output in multivalue. Binary Multivalue Conversion 2022 converts one-bit binary images into 8-bit 256 gradients. Reversely, Multivalue Binary Conversion 2026 converts for example, 8-bit 256 gradient images into one-bit binary images by the error diffusion processing technique, etc. Synthesis 2023 has a function for synthesizing two multivalue images into one multivalue image. For example, by synthesizing a corporate logo image and a document image, the corporate logo can be attached to the document logo. Omission 2024 carries out resolution conversion by omitting pixels of a multivalue image, and multivalues with the resolutions of ½, ¼ and ⅛ can be output. By using omission together with the above mentioned variable power 2020, wider expansion and compaction can be carried out. Move 2025 carries out processing such as placing margin portions to the input binary images and multivalue images, and deleting the margin portions. Above-mentioned Rotation 2019, Variable Power 2020, Color Space Conversion 2021, Binary Multivalue 2022, Synthesis 2023, Omission 2024, Move 2025 and Multivalue Binary 2026 can be operated with linking to each other. For example, when a multivalue image is rotated and resolution-converted, both processing can be carried out without intervention of the RAM.

Figure 3:
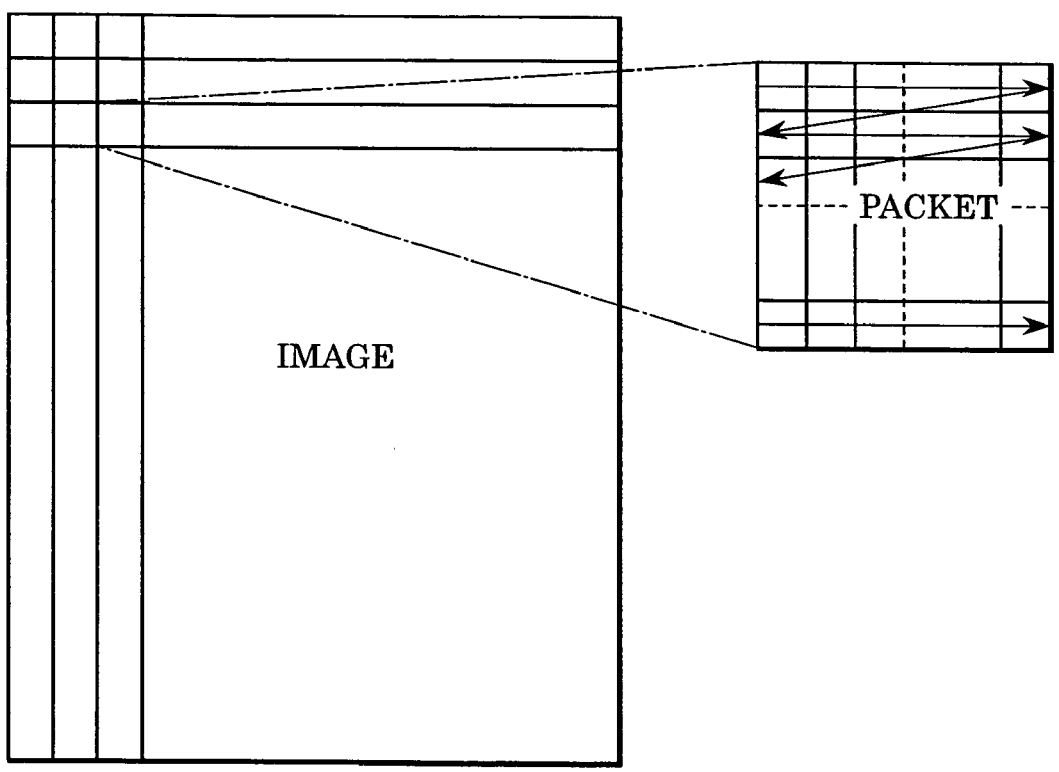
FIG. 3 is a view showing an image format in various kinds of above-mentioned processing in the controller unit 2000.

FIG. 3 illustrates image format in various kinds of above-mentioned processing in the controller unit 2000. For example, Compaction 2012 realigns an image in raster format into a packet in the unit of 32 pixels×32 pixels as shown in FIG. 3 and carries out JPEG-compaction for every packet. Information such as ID indicating the packet position, color space, Q-table ID, data length is added to the packet as a header.

Input image identification information, which will be described later regarding the embodiment according to the present invention, is included in the header of the packet. An image quality identifier indicating whether the data should be high quality or low quality or an input origin equipment identifier indicating whether the input origin of the image is a scanner and what kind of description language is used for the image data is included in the input image identification information. By referring to the input image identification information, a printer section is set for switching six color printing or four color printing.

Figure 4:
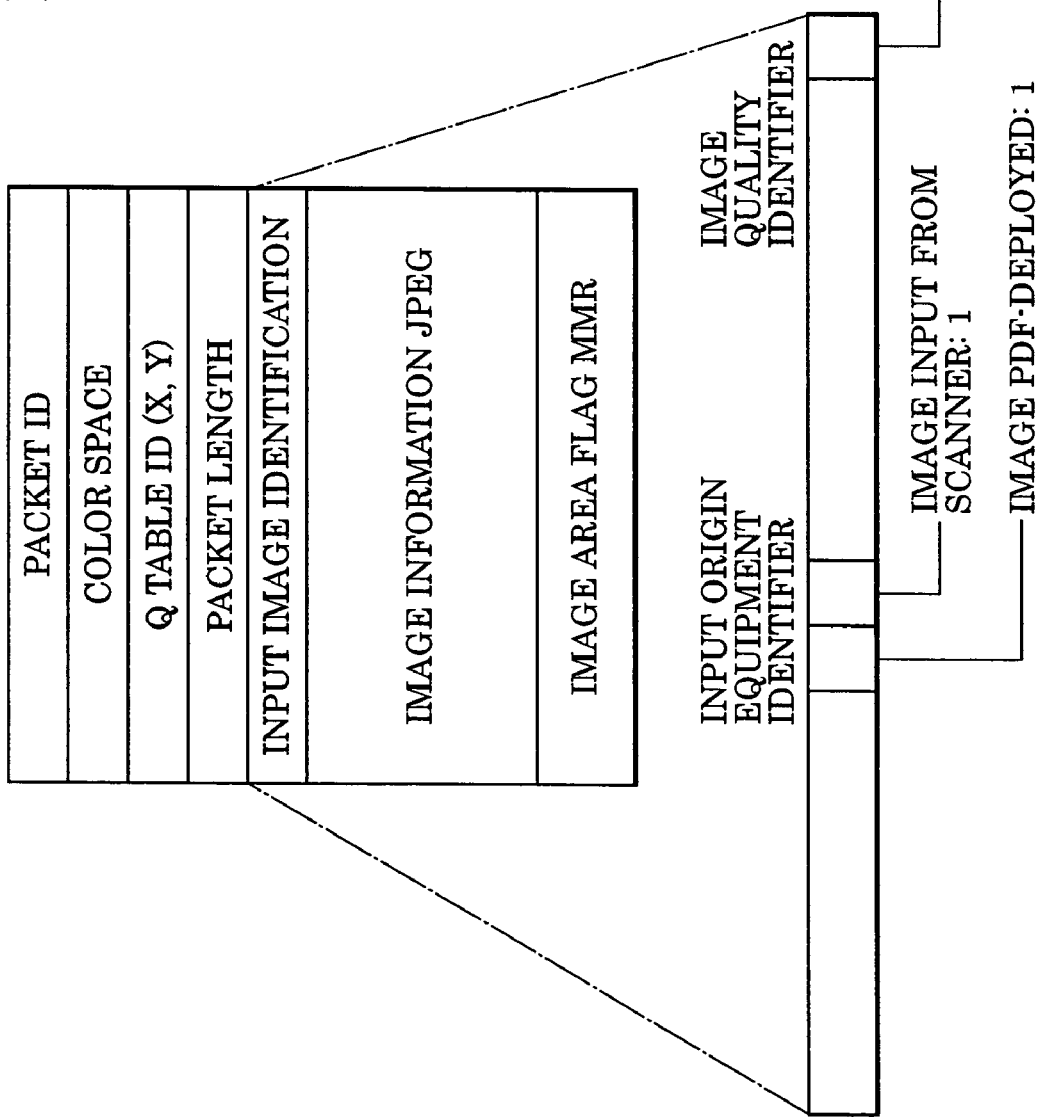
FIG. 4 is a view schematically illustrating packet data described in FIG. 3.

In the packet data, an image area flag as binary data indicating characters or photographs is similarly compacted and added to the rear of the JPEG image information. FIG. 4 is a view schematically illustrating packet data as printing information described above.

Expansion 2013 JPEG deploys the data on the basis of the header information and realigns the data into raster images. In processing of Rotation 2019, the image can be rotated partly by expansion and compaction by rotating solely images of the packet data and by changing the packet ID position, and thus efficiency can be improved. All of the image data on the image bus 2010 is packet data. When raster images are required for fax transmission, Binary Image Rotation 2052, Binary Image Compaction/Expansion 2053, etc., software is used for converting the packet images into the raster images.

Figure 5:
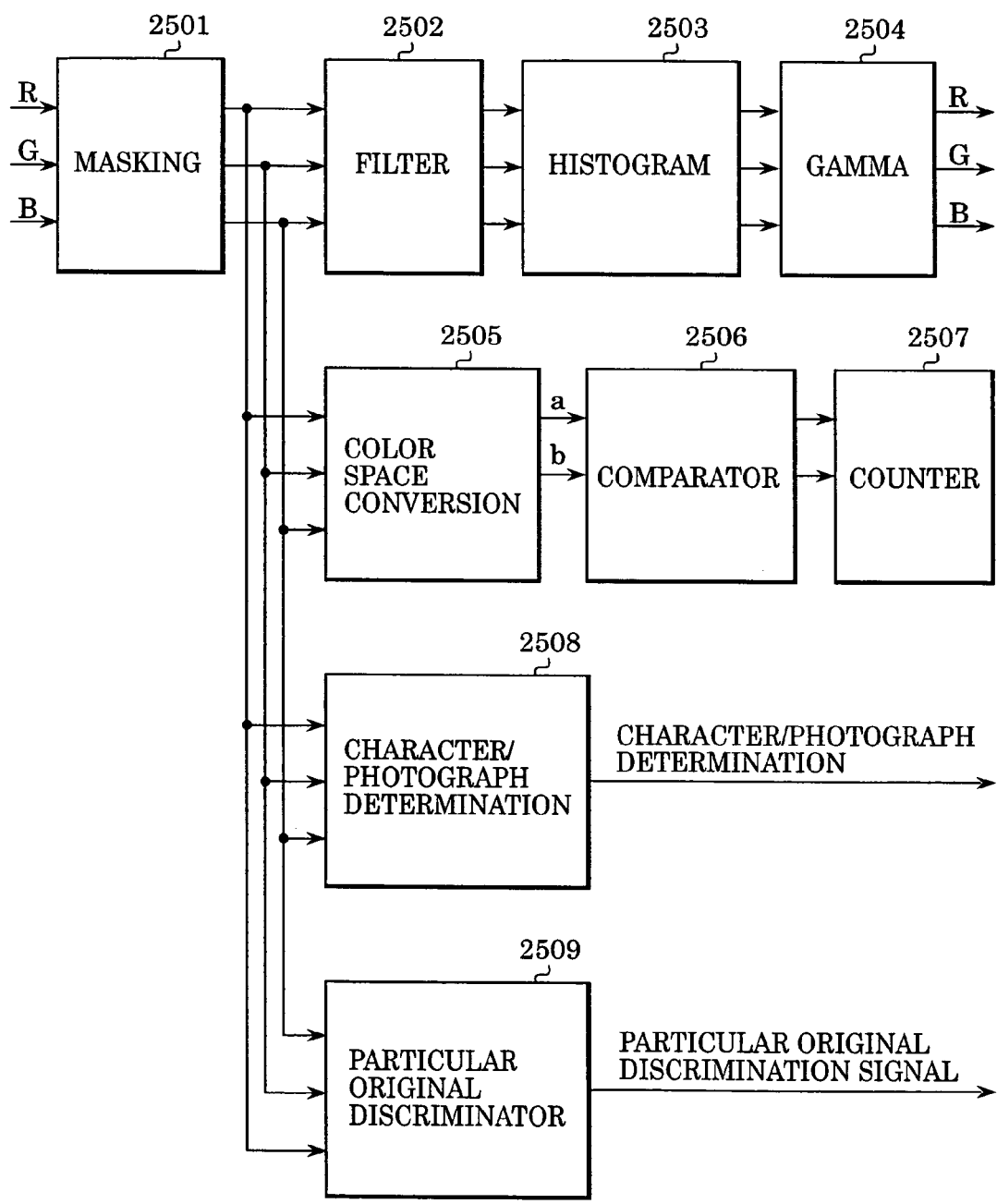
FIG. 5 is a view illustrating the detailed structure of a scanner image processing shown in FIG. 2.

FIG. 5 is a view illustrating the detailed structure of Scanner Image Processing 2014. An intensity signal of respective 8-bit RGB (red-green-blue) as an image input from a scanner 2015 is first converted into a standard RGB color signal not depending on the filter color of an image pickup element by Masking 2501. Filter 2502 vignettes and well modulates images by using, for example 9×9 matrix for the converted color signal. Histogram 2503 is a processing section for sampling the color signal and determining the foundation level of the input image by this sampling operation. Thus, in this sampling process, the RGB data in a rectangle region surrounded by the starting point and end point respectively specified in the main scanning direction and auxiliary scanning direction is sampled in the main scanning direction and auxiliary direction by a constant pitch, and a histogram is created. The histogram is stored and managed in a memory and HDD together with the images. When prevention of a foundation skip or rear side printing is specified, the histogram is read out and used for image processing at the time of printing and transmitting as foundation skip level. Gamma 2504 carries out processing to make the concentration of the entire image thicker or thinner. Gamma 2504 is a section for carrying out correction regarding color tint of an input system such as converting a color space of the input image into an optional color space.

Color Space Conversion 2505 converts an image signal before magnifying into a widely-known Lab in order to discriminate whether the document is color or black-and-white. Where, a and b (in FIG. 5) indicate color signal components. Comparator 2506 outputs a chromatic color if the color signal component is at a predetermined level or higher, and if not, it outputs a one-bit discrimination signal as an achromatic color. Counter 2507 counts the outputs from the comparator 2506.

Character/photograph Determination 2508 extracts character edges from the input images and separates the image into characters and photographs. As the output, a character/photograph discrimination signal is obtained. The signal is also stored in the memory and HDD together with the images and it will be used when printing. Particular original discriminator 2509 compares at what level the patterns and input images stored therein are identical and outputs a particular original discrimination signal indicating the discrimination result of being identical or non-identical. According to the discrimination result, the images are processed for preventing forgery of bills or securities.

Figure 6:
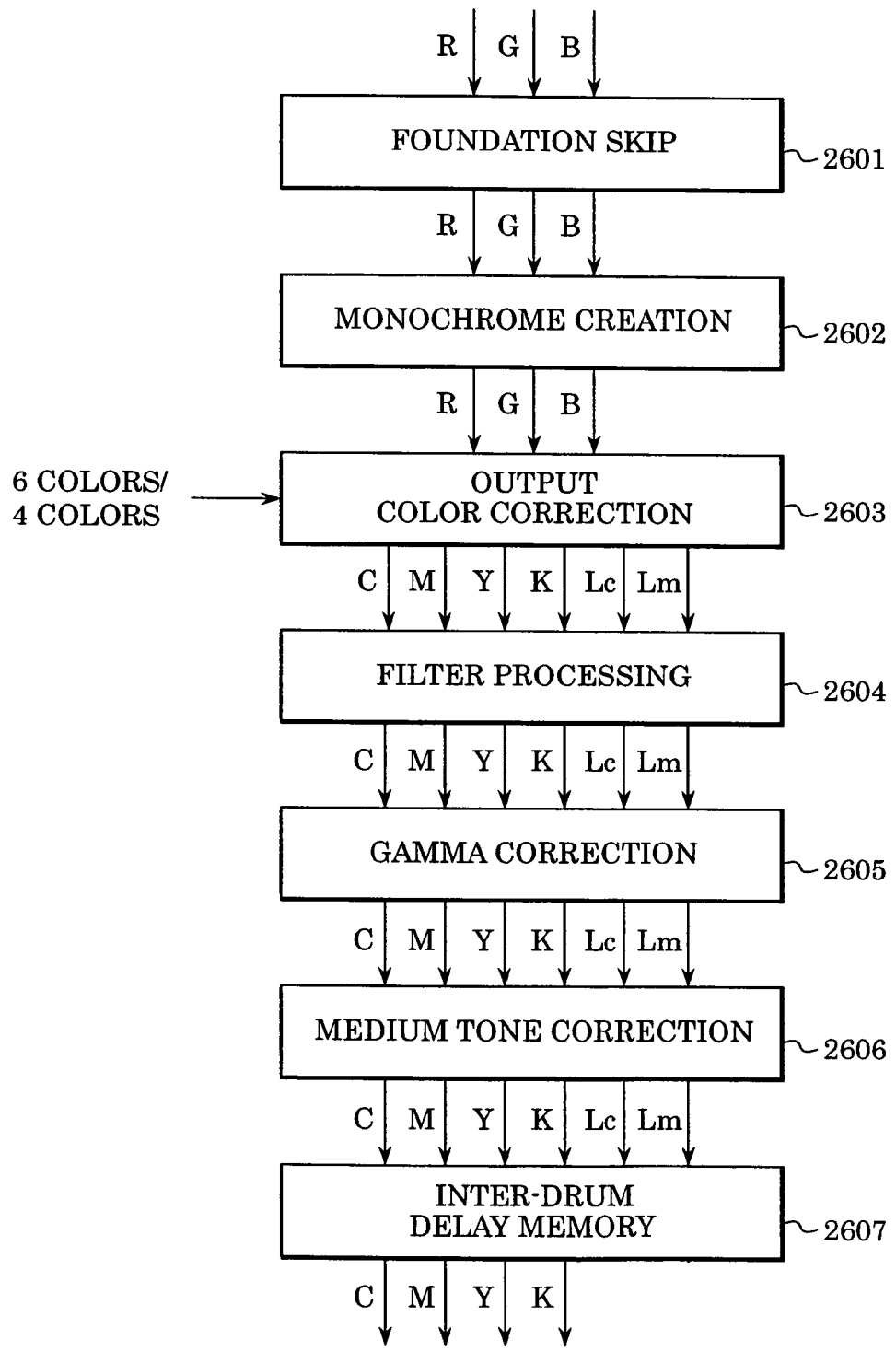
FIG. 6 is a view illustrating the detailed processing in the printer image processing 2016 shown in FIG. 2.

FIG. 6 is a view illustrating detailed processing in a printer image processing 2016.

The printer image processing 2016 carries out foundation skip of the image data by Foundation Skip 2601 first for eliminating unnecessary fogging. This processing is carried out by using, for example 3×8 matrix operation or one-dimensional LUT. These functions are also included in Color Space Conversion 2021 as described above. Next, Monochrome Creation 2602 creates monochrome data on the basis of color image data of R, G, B color signals. This processing is to convert, for example RGB data into gray single color. This processing is constituted by having 1×3 matrix operation for multiplying the RGB signal by a predetermined constant to be a gray signal.

Output Color Correction 2603 corrects the colors according to the property of a printer section (printer section 2017 when printing out by this printer 200) printing and outputting the images. This processing is constituted so as to have processing such as 4×8 matrix operation, direct mapping, etc. R, G, B color signals as the image data to be input are converted into six colors of C, M, Y, K, Lc and Lc or four colors of C, M, Y and K according to the setting of six color printing or four color printing, which will be described later. In the example, the color signals corresponding to cyan (C), magenta (M), yellow (Y), black (K), light cyan (Lc) and light magenta (Lm) as six color toner colors in the printer section 2017 or the color signals corresponding to four colors of cyan (C), magenta (M), yellow (Y) and black (K) are respectively output in 600 dpi (dots per inch) and 8 bit signals.

Filter Processing 2604 carries out predetermined correction for the space frequency of image data. This processing can be carried out by 9×9 matrix operation for example. Gamma Correction 2605 carries out gamma correction according to the property of a printer section for printing and outputting. This processing is normally carried out by using one-dimensional LUT. Medium Tone Correction 2606 carries out quantization according to the number of gradients when printing by the printer section. Medium Tone Correction 2606 carries out predetermined screening or error diffusion processing such as making binary images or 32 ry images. Respective processing can be switched by the above-mentioned character/photograph discrimination signal. Finally, Inter-drum Delay Memory 2607 temporarily stores the respective color signals in order to shift the image forming timing of respective drums of six colors of CMYKLcLm in the printer section. Thus, images of the respective colors of CMYKLcLm can be overlapped. Similarly, inter-drum delay can be carried out for four colors when the outputs of Output Color Correction 2603 are four colors of CMYK.

Figure 7:
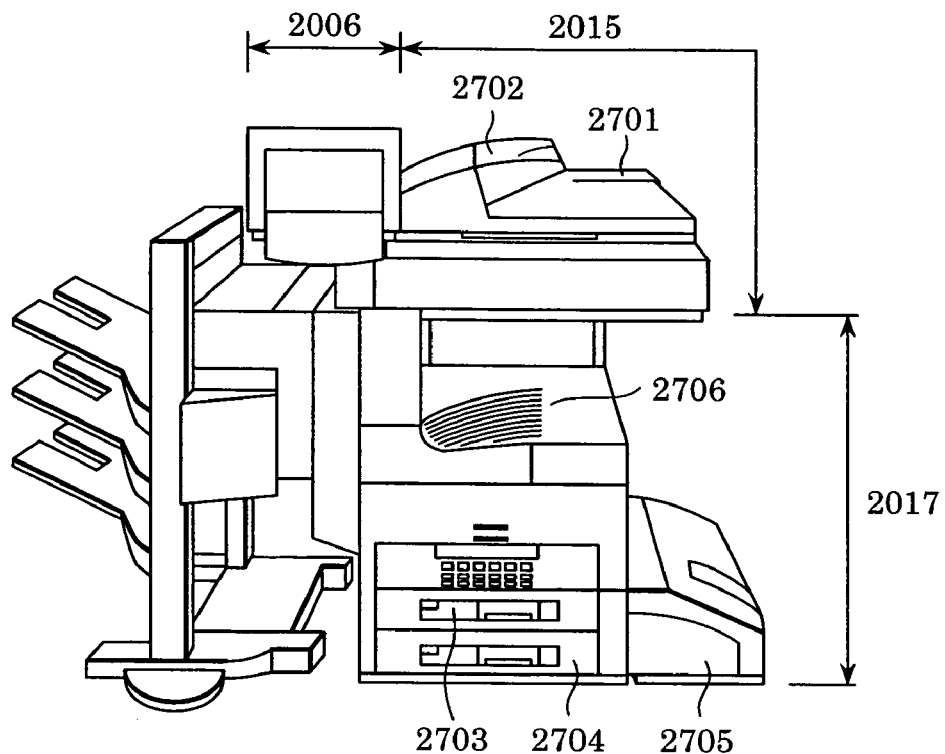
FIG. 7 is a perspective view illustrating the appearance of a multifunctional printer 200 shown in FIG. 2, regarding one embodiment according to the present invention.

FIG. 7 is a perspective view illustrating appearance of a multifunctional printer 200 of the present embodiment.

A scanner section 2015 as an image input section includes an image pickup element and reads out images. There are various kinds of techniques used for image pickup elements, and typically, the CCD (charge coupled device) technique and the CIS (contact image sensor) technique are widely known. Both the CCD and CIS techniques are used for receiving light, converting it into electric signals and outputing the signals as image data. The CIS technique is inferior to the CCD technique in the property and image quality since the optical system is simplified, the depth of field is small and three-dimensional documents cannot be read out, that the color reproducibility and signal accuracy are inferior as being simplified in electric charge storage quantity of a color filter and element itself and that the image signal is susceptible to noises as the optical source and the image pickup element are integrated. However, the CIS technique has the advantage to the CCD technique in that the number of section items is small and thus the costs can be smaller. Accordingly, the CCD technique is often used for an expensive scanner that requires high quality while the CIS technique is often used for a relatively low-cost scanner that requires cost performance.

In the present embodiment, the respective scanner sections 2015, 2270 of the printers 200, 220 use the CCD technique while the scanner section 2370 of the printer 230 uses the CIS technique.

The scanner section 2015 converts the images into electric signals as raster image data by illuminating the images on paper to be an original and by carrying out scanning by an image pick up unit (not shown in the drawings). The original paper is set on a tray 2702 of a document feeder 2701. When a user directs read-out operation via an operation section 2006, CPU 2001 of a controller 2000 directs the scanner section 2015, feeds the original paper one by one from the tray 2702 of the feeder 2701 and reads out the original image.

The printer section 2017 is a section for outputting the raster image data on the paper as images. The present embodiment is a format of a color LBP (laser beam printer) adopting electrophotographic technique that forms latent images on a photoconductor drum by laser irradiation on the basis of the raster image data and visualizes the latent images. As for printing techniques, other than this electrophotographic technique, there is the ink jet technique for discharging ink from a minor discharge port and directly forming images on the paper. It is apparent following descriptions that the present invention can be applied to any of the techniques.

The resolution in image forming of this printer section 2017 is 600 dpi. The printer section 2017 adopts six-series tandem technique including photoconductors respectively for C, M, Y, K, Lc and Lm and prints out these colors and various colors formed by combining these colors. Hyperchromic and hypochromic toner developers are created by changing the quantity of pigments with the equivalent spectral characteristic. Accordingly, thin magenta toner has equivalent spectral characteristic of the contained pigments as magenta while the contents of the pigments are smaller. Thick cyan toner has equivalent spectral characteristic of the contained pigments as cyan while the contents of the pigments are smaller. By using thick and thin colors for magenta and cyan, high quality images can be formed by six color printing using the thin toners such that graininess in thin colored images such as human skin decreases and the reproducibility is improved.

In such a printer structure, in the embodiment according to the present invention, as described later, a printing mode using six colors is used when the property of image data to be printed can realize image quality up to the level of printing using six color toners as described above while a printing mode using four color toners of C, M, Y and K is used when the property of image data to be printed cannot realize image quality up to the level of printing even using six color toners.

Printing operation is started by the controller CPU 2001 to direct printing operation to the printer section 2017 accordingly when copy operation is directed in other printers or its own printer or when printing is directed by the PC. The printer section 2017 has a plurality of paper feed stages so as to select different paper sizes or different paper directions and the printer section 2017 includes paper cassettes 2703, 2704, 2705 corresponding to the sizes or directions. A delivery tray 2706 receives and loads printed paper.

Figure 8:
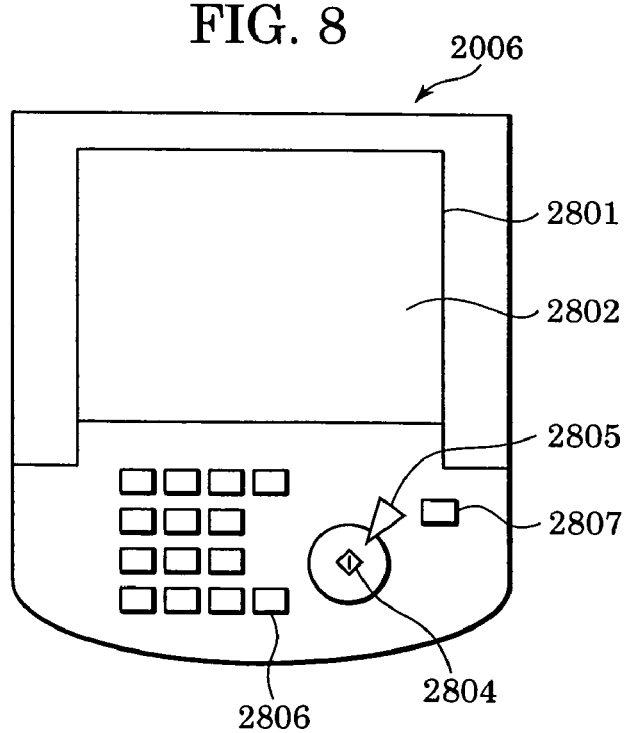
FIG. 8 is a view illustrating the structure of an operation section 2006 shown in FIG. 2.

FIG. 8 is a view illustrating the detailed structure of an operation section 2006. As shown in the drawing, an LCD (liquid crystal display) section 2801 is constituted by attaching a touch panel sheet 2802 on an LCD, and it displays the operation picture and soft keys regarding the printer 200. When the displayed key is pushed down, the positional information is transmitted to the controller CPU 2001 and processing according to the key operation is carried out. A start key is used when starting reading of the original images. LED (light emitting diode) 2804 capable of emitting green or red is provided to the center of the start key, and its color can indicate whether or not pressing of the start key is effective. A stop key 2805 is a key for stopping reading operation. An ID key 2806 is used when a user ID is input. A reset key 2807 is used when the setting by the operation section is initialized.

Figure 9:
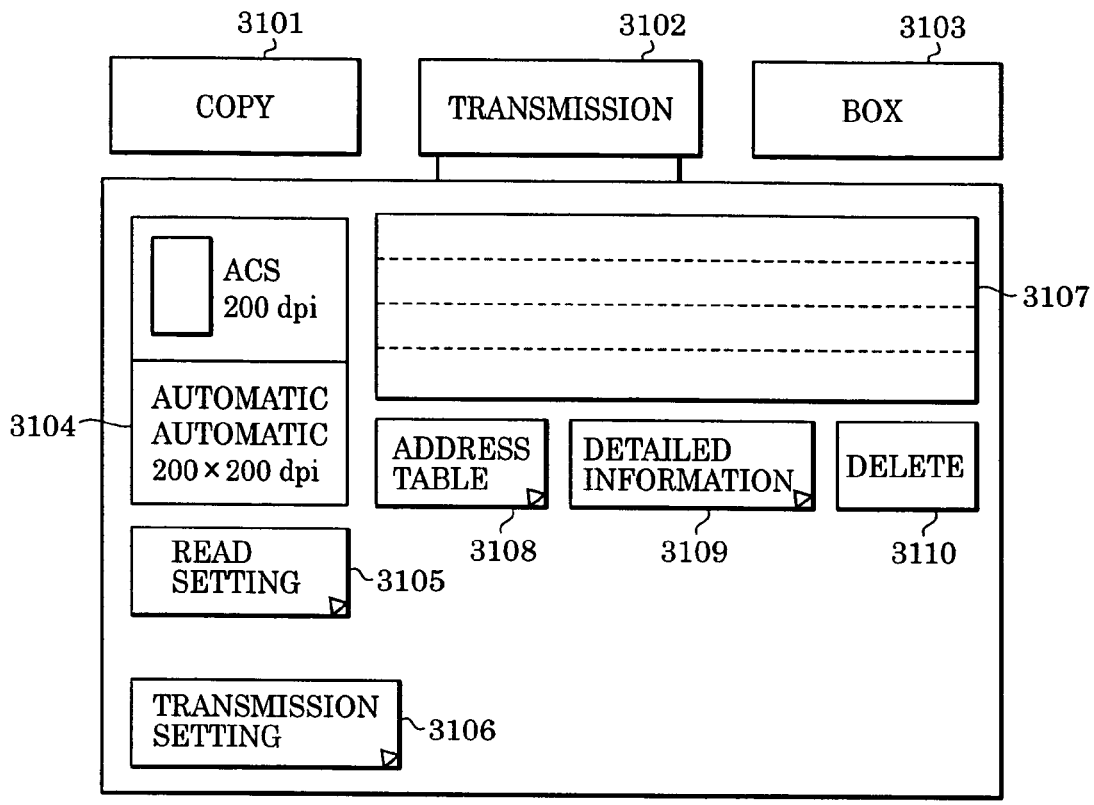
FIG. 9 is a view illustrating the initial picture of an LCD display section 2801 of the operation section 2006 shown in FIG. 8.

FIG. 9 is a view illustrating the initial picture of an LCD section 2801 of the operation section 2006 shown in FIG. 8 and the picture is a standard picture returned after various kinds of setting. In the initial picture, Copy 3101 is a tab for carrying out setting regarding copy operations, and pushing of the tab leads to switching to a copy setting picture. Transmission 3102 is a tab for switching to a picture for carrying out setting when the scanned image is transmitted by fax or electronic mail. Box 3103 is a tag for switching to a picture for setting when the scanned images and PDL images are stored in HDD 2004 and when the stored scanned images and PDL images are printed, transmitted or edited.

Window 3104 displays setting contents in reading of the original set via the setting picture having been switched by a read setting button 3105. On the setting picture by the read setting button 3105, the resolution, concentration, etc. can be set at the time of reading of the original. Transmission setting button 3106 is a button for switching to a picture for timer setting in transmitting of a timer or setting when printing by HDD or a printer. Window 3107 displays transmission destination by operation of an address table button 3108. A detailed information button 3109 is a button for switching one of the addresses displayed on the Window 3107 to the detailed information display. Furthermore, a delete button 3110 is a button for deleting one of the addresses displayed on the Window 3107.

Figure 10:
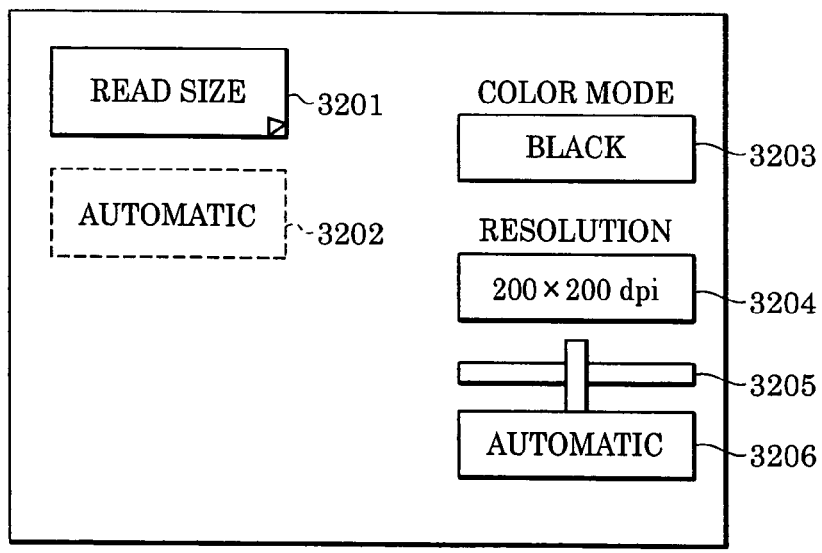
FIG. 10 is a view illustrating a pop-up window displayed when a read setting button 3105 in the initial picture is pushed down.

FIG. 10 is a view illustrating a pop-up window displayed when a read setting button 3105 is pushed down. In the drawing, when a read size button 3201 is pushed down, a pop-up indicating the readable original sizes is displayed and the size of the original to be actually read out can be selected. The selected size of the original to be read out is displayed on a region 3202. A color mode region 3203 is a region for selecting original reading modes and one of three modes of color/black/automatic (ACC) can be selected therefrom. The color mode can be also selected by using the above-mentioned copy tab or box tab. By the selection, in the reading operation, color images are accumulated when the selected read mode is the color mode, and monochrome images as accumulated when the selected read mode is the black mode. Monochromating of image data is carried out by Gamma 2504. In the ACS mode, the result of whether the original was color or black-and-white is accumulated together with the color image. For the discrimination of whether the original is color or black-and-white, it is considered to be the black-and-white original when the counting result of the counter 2507 shown in FIG. 5 is smaller than a predetermined value and the color original when the counting result is larger than the predetermined value. In the ACS mode, the accumulated image data is normally color images and is monochromated in Monochrome Creation 2602 when printing according to the discrimination result of whether the original was color or black-and-white. A resolution region 3204 is a region for specifying the reading resolution and the resolution can be selected via this region. A reading concentration portion 2305 is a slider for adjusting the reading concentration of the original and 9-stage reading concentration adjustment can be carried out by the operation. An automatic button 3206 is a button for selecting automatic concentration setting, and when images with overlapped foundation such as newspaper are read out, the concentration can be automatically set by this button. The concentration automatic setting by the button 3206 can be similarly carried out by Copy.

Figure 11:
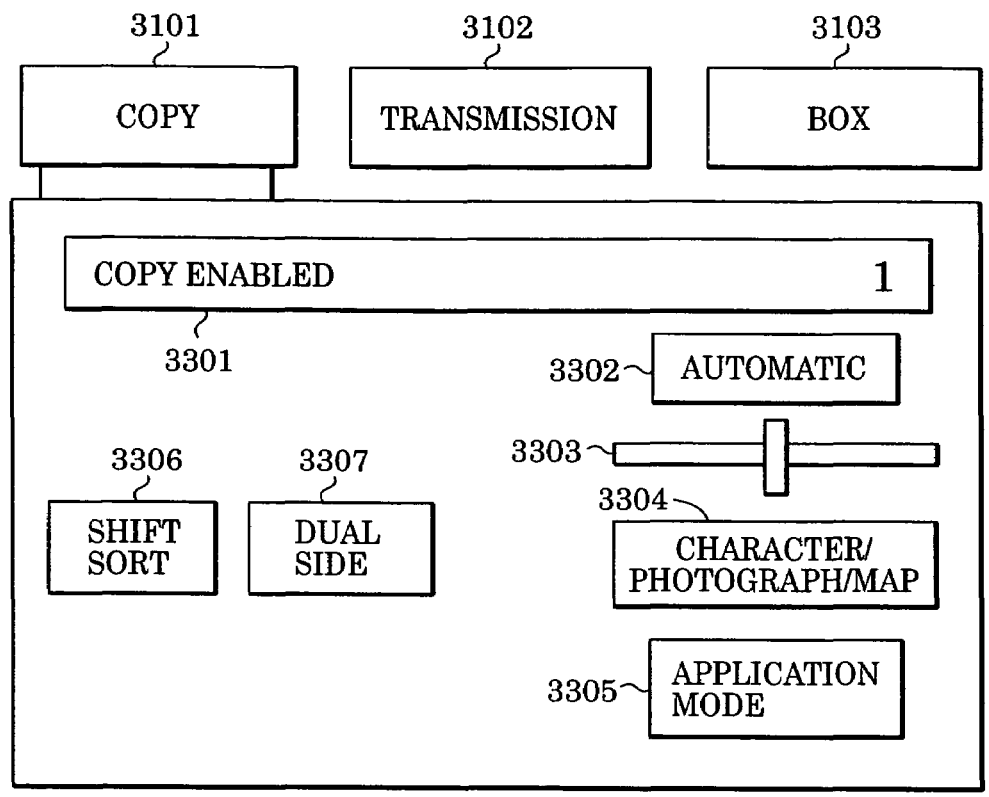
FIG. 11 is a view illustrating the picture replaced when a copy tab 3101 shown in FIG. 9 is pushed down.

FIG. 11 is a view illustrating the picture replaced when a copy tab 3101 shown in FIG. 9 is pushed down and for carrying out various kinds of setting regarding copying. In FIG. 11, a display region 3301 displays whether or not copying is possible. Alternatively, the number of copying set may be displayed in display region 3301. An automatic button 3302 has the same function as the automatic button 3206 shown in FIG. 10 and for selecting whether or not the foundation removal is carried out automatically. A reading concentration portion 3303 is a slider and has the same function as the reading concentration portion 3205 shown in FIG. 10, permitting 9-stage concentration adjustment. A character/photograph/map region 3304 is a region for selecting the type of the original, and in the present embodiment, character/photograph/map, character, photographic paper photograph, and printing photograph can be selected. An application mode button 3305 is used for reduction layout (the function for reducing and printing a plurality of originals into one piece of paper) and color balance (minor adjustment of respective colors of CMYK) can be set.

A shift sort button 3306 is a setting button regarding various kinds of finishing and by the operation of this button, shift sort, staple sort and group sort can be set. A dual side button 3307 is a button for carrying out setting regarding dual side reading and dual side printing.

Figure 12:
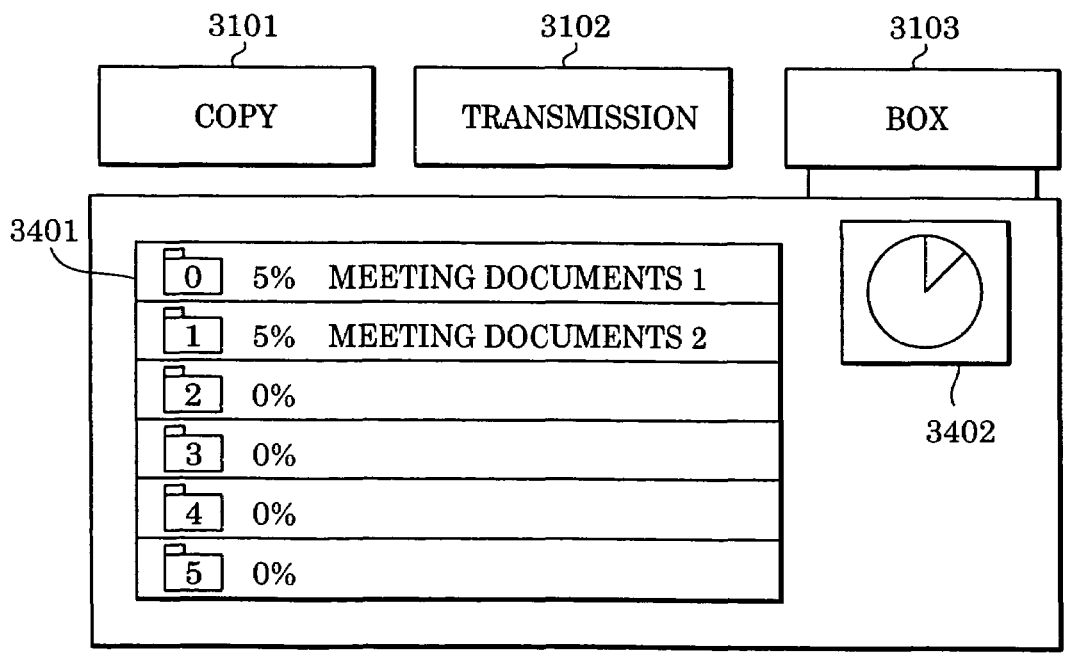
FIG. 12 is a view illustrating the picture displayed when a box tab 3103 shown in FIG. 9 is pushed down.

FIG. 12 is a view illustrating the picture displayed when the box tab 3103 shown in FIG. 9 is pushed down. In FIG. 12, a folder display 3401 is a display of folders formed by logically sectioning the HDD. Folder numbers are previously assigned to the respective folders, and '3401' indicates the folder of number of 0. The percentage of disc capacity used for the folder is displayed on the side of the folder number. Optional names can be given to the folders and the names are respectively displayed. A usage portion 3402 indicates the use quantity of the entire HDD.

Figure 13:
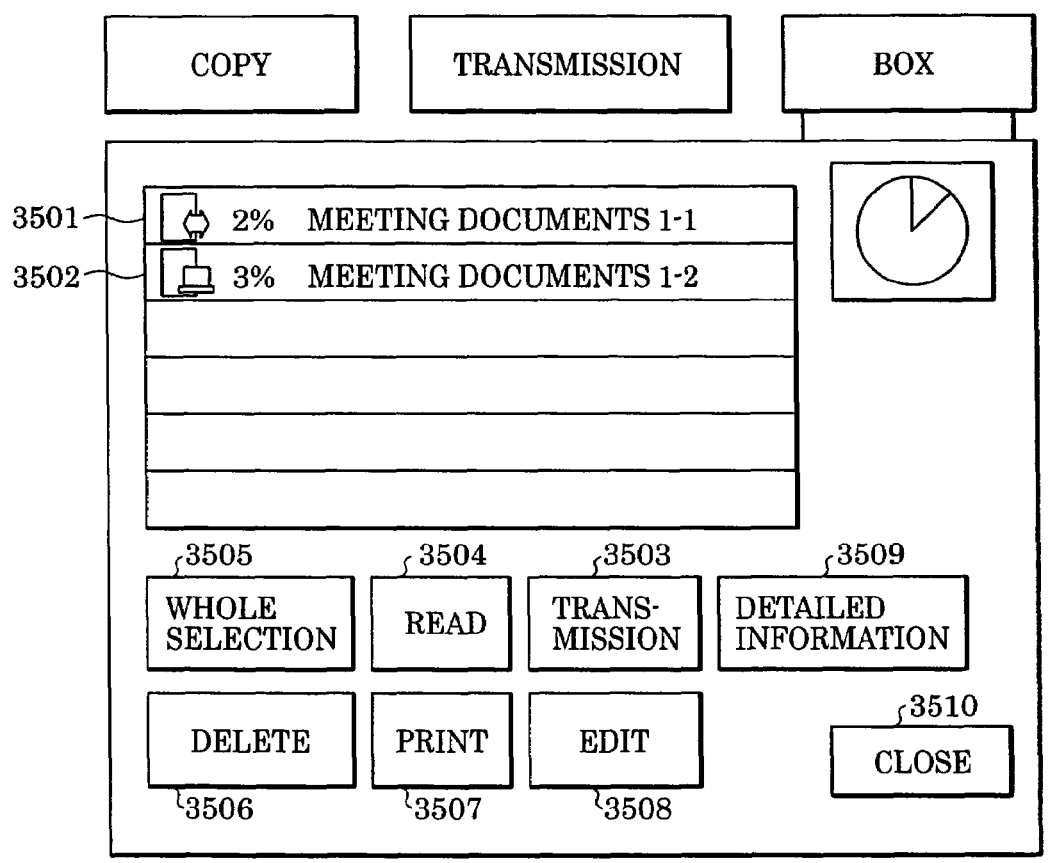
FIG. 13 is a view illustrating the picture displayed when a displayed portion of the folder 3401 shown in FIG. 12 is pushed down.

FIG. 13 is a view illustrating the picture displayed when a displayed portion (i.e., a folder) of the folder display 3401 shown in FIG. 12 is pushed down. In FIG. 13, document portions 3501 and 3502 indicate documents stored in the folder. The document is constituted by a plurality of pages. A document portion 3501 includes an icon indicating that the document should be a scanned document. The document portion 3501 also indicates HDD use quantity, and the document name which can be optionally set by a user. A document portion 3502 includes an icon that indicates that the document is a document stored from PDL. By pushing down each icon, selection of the document is indicated by a reverse display. A transmission button 3503 is a button for transmitting the selected document, a read button 3504 is a button for reading out the original from the scanner and for preparing the document, a whole section button 3505 is a button for selecting all of the documents in the folder, a delete button 3506 is a button for deleting the selected documents, a print button 3507 is a button for printing out the selected documents, and an edit button 3508 is a button for editing the selected documents. By the operation of the above buttons, for example, two documents can be selected, combined and made into one document for storing or specific pages can be deleted. A detailed information button 3509 is a button for displaying the detailed information of the finally selected documents. Other than that, information such as the resolution, document size, color can be also displayed. A close button 3510 is used to close the currently displayed window.

Figure 14:
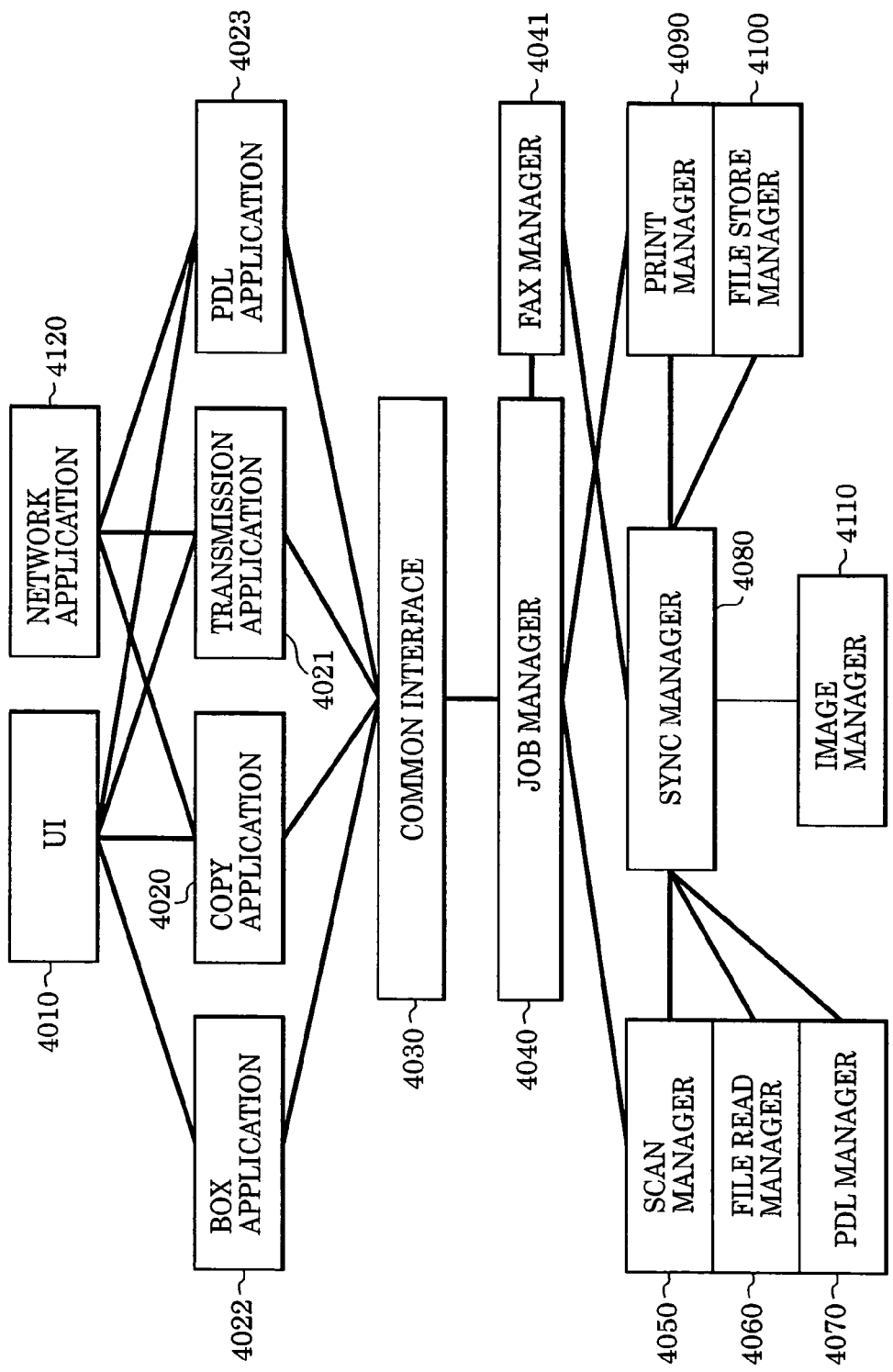
FIG. 14 is a view illustrating the structure of software operated in a controller 2000 of the multifunctional printer 200 shown in FIG. 2.

FIG. 14 is a view illustrating the structure of software operated in the controller 2000 of the multifunctional printer 200 described in FIG. 2. The printer of the present embodiment such as the multifunctional printer 200 is an information processor that will work as described herein.

In FIG. 14, a UI portion 4010 indicates a UI control section controlling the operation section 2006, and a copy application section 4020 executes a copy operation by the direction of the UI control section 4010. Similarly, a transmission application section 4021 and a box application section 4022 carry out transmission operation and scanning and copying from a box image respectively in response to the direction from the UI control section 4010. A PDL application section 4023 receives PDL printing information from a network application 4120 and inputs a PDL print job. A common interface portion 4030 is a common interface section for absorbing the equipment depending section of an equipment control section, and a job manager portion 4040 is a job manager aligning job information received from the common interface and transferring it to a lower level document processing section.

When carrying out local copy, this document processing section will be a scan manager 4050 and a print manager 4090. When carrying out the transmission job of remote-copying or solely a transmission job, the document processing section will be the scan manager 4050 and a file store manager 4100. When carrying out the reception job in remote-copying, the document processing section will be a file read manager 4060 and the print manager 4090, and when carrying out PDL printing such as LIPS, PostScript, it will be a PDL manager 4070 and the print manager 4090. Synchronization between these document managers and the request of image processing to an image manager 4110 carrying out various kinds of image processing are carried out via a sync manager 4080. Image processing and storing of image files in scanning and printing are carried out by the image manager 4110.

First, in the local copy processing with above software structure, of the present embodiment, the original is read out by the scanner section 2015 (FIG. 1) of the multifunctional printer 200 and printed out by the printer section 2017, which will be described below.

According to the user direction via the operation section 2006, the copy setting together with the copy direction is transmitted to a copy application section 4020 from the UI control section 4010. The copy application section 4020 transmits information from the UI control section 4010 to the job manager 4040 carrying out equipment control via the common interface 4030. While the job manager 4040 transfers job information to the scan manager 4050 and the print manager 4090.

The scan manager requests scanning to the scanner section 2015 via a device I/F, (device I/F is respective serial I/F connecting a controller 2000 and the scanner section 2015, and the controller 2000 and the printer section 2017) not shown in the drawings. It requests simultaneously image processing for scanning to the image manager 4110 via the sync manager 4080. While the job manager 4110 transfers job information to the scan manager 4050 and the print manager 2014. When completing setting, it transfers scanning preparation completion to the scan manager 4050 via the sync manager 4080. After that, the scan manager 4050 directs scanning operation to the scanner section 2015. Transfer completion of the scanned images by the scanning operation is transferred to the image manager 4110 by an interrupt signal from hardware not shown in the drawings. In response to the scanning completion from the image manager 4110, the sync manager 4080 transfers the scanning completion to the scan manager 4050 and the print manager 4090. Simultaneously, the sync manager 4080 directs to the image manager that the compacted images accumulated in RAM 2002 should be made into files in the HDD 2004. According to the direction, the image manager 4110 stores the images on the memory in HDD 2004. As accompanying information to the images, the color discrimination/black-and-white results, the foundation skip level for carrying out foundation skip, the scanned images as image input source, and the color space RGB are also static RAM (SRAM) not shown in the drawings. When the above-mentioned information storage to HDD 2004 is completed and the scanning completion signal is received from the scanner 2015, making of files is notified to the scan manager 4050 via the sync manager 4080. The scan manager 4050 returns the completion notification to the job manager 4040, and the job manager 4040 returns the completion notification to Copy Application 4020 via the common interface 4030.

While the print manager requests printing to the printer section 2017 via the device I/F when the read out images are stored in the memory. Simultaneously, it also requests printed image processing to the sync manager 4080. When the sync manager 4080 receives the request from the print manager 4090, it requests image processing setting to the image manager 4110. The image manager 4110 sets the printer image processing section 2016 according to the above-mentioned accompanying information of the images and transfers the printing preparation completion to the print manager 4090 via the sync manager 4080. The print manager 4090 directs printing to the printer section 2017. The image transfer completion to the printer section is transferred to the image manager 4110 by the interrupt signal from hardware (not shown). In response to the printing completion from the image manager 4110, the sync manager 4080 transfers the printing completion to the print manager 4090. The print manager 4090 returns the completion notification to the job manager 4040 in response to the printing completion from the printer section 2017, and the job manager 4040 returns the completion notification to the copy application section 4020 via the common interface 4030. When the copy application section 4020 receives the scanning and printing completion notifications as above, it notifies the UI control section 4010 of the job completion.

Next, the scan job and transmission job of remote-copying are described. In the present embodiment, as described above, the original is read out by the local printer 200, the image data is transmitted to the printer 220 or printer 230 as the remote printer and (copy) printing is carried out by the printer, or the image data is transmitted to the other equipment connected to a network, which will be described below.

Execution of the scan job in this processing is the same as that for the above-mentioned local-copying. While in the transmission job, instead of the above-mentioned print manager 4090, the file store manager 4110 receives the request from the job manager 4040. The store manager 4100 receives the storage completion notification from the sync manager 4080 at the time of completion of storage of the scanned and read out images in HDD, and via the common interface 4030, the notification is notified to Copy Application 4020 for remote-copying and to Transmission Application 4021 for transmission job. Copy Application 4020 and Transmission Application 4021 respectively request transmission of the image files stored in HDD to Network Application 4120 when receiving the notification. The Network Application 4120 having received the request transmits the files. Network Application 4120 receives setting information regarding copying from the copy application section 4020 at the time of starting of jobs and also notifies to remote side equipment of it. Network Application 4120 carries out transmission using equipment-specific communication protocol in remote-copying. In transmission job, it uses standard file transfer protocol such as FTP, SMB.

When carrying out fax transmission, if the read out image files are stored in HDD, the transmission is directed to a fax manager 4041 from Transmission Application 4021 via the common interface 4030 and the job manager 4040. The fax manager 4041 negotiates with the counterpart equipment via a modem 2050, requests the image manager 4110 of requested image processing (color to black-and-white conversion, multivalue binary conversion, rotation, variable power) and transmits the converted images by the modem 2050.

In the execution of above-mentioned transmission jobs, when the printer of transmission destination is made to carry out printing, Transmission Application 4021 directs printing as a print job via the common interface 4030. If the transmission destination is the box inside equipment, the image files are stored in a file system inside equipment by a file store manager. In the reception of fax, the fax manager 4041 receives the images using the modem 2050 and stores them in HDD 2004 as image files. When notifying to Box Application 4022 after storing of the images in HDD 2004, the direction of reception printing is given to the job manager from Box Application 4022 via the common interface 4030. After that, since the operations will be the same as the normal box print jobs, it is omitted.

Next, the print job of remote-copying is described. Processing when image data is transmitted to the printer 200 as a printer regarding the present embodiment from other printer and printed, or when the printer 200 is a local printer from the view of the other printer is described.

First, Network Application 4120 stores transmitted images in the HDD and issues the jobs to Copy Application 4020. While Copy Application 4020 inputs the print job to the job manager 4040 via the common interface 4030. Differently from the above-described local-copying, a file read manager 4060 receives the request from the job manager 4040 instead of the scan manager 4050. The file read manager 4060 carries out the request for deploying the received images to a memory from HDD to the image manager 4110 via the sync manager 4080. In response to this, the image manager 4110 deploys the images to the memory. The image manager 4110 transmits the deployment completion to the file read manager 4060 and the print manager 4090 via the sync manager 4080 at the time of completion of deployment of the images. The print manager 4090 selects the paper feed stage directed by the job manager or a stage having the paper size and issues printing request to the printer section 2017 via the device I/F at the time of deployment of the images to the memory. In automatic paper feeding, it determines the paper feed stage from the image size and issues printing request. Simultaneously, it also requests printed image processing to the sync manager 4080. When the sync manager 4080 receives the request from the print manager 4090, it requests printed image processing setting to the image manager 4110. At that time, for example, if paper with optimal size is not available and rotation is required, the rotation direction is also requested separately. When receiving the rotation direction, the image manager rotates the images using Image Rotation 2019. The image manager 4110 sets the printer image processing section 2016 and transfers the printing preparation completion to the print manager 4090 via the sync manager 4080. The print manager 4090 directs printing to the printer section 2017.

The printed image transfer completion is transferred to the image manager 4110 by the interrupt signal from hardware (not shown). In response to the printing completion from the image manager 4110, the sync manager 4080 transfers the printing completion to the file read manager 4060 and the print manager 4090. The file read manager 4060 returns the completion notification to the job manager 4040. In response to the paper delivery completion from the printer section 2017, the print manager 4090 returns the completion notification to the job manager 4040. The job manager 4040 returns the completion notification to the copy application section 4020 via the common interface 4030. When the copy application section 4020 completes the above-mentioned printing, it notifies the UI control section of the job completion.

Next, processing of PDL data deploying and storing job is described. This processing is carried out when PDL data is transferred as printing information from a host device such as PC 240 to the printer 200 regarding the embodiment according to the present invention.

The request from the host PC 240 to which PDL printing is input is transferred to PDL Application 4023 via Network Application 4120. PDL Application 4023 directs the PDL data deployment job to the job manager 4040 via the common interface 4030. Thus, the PDL manager and the store manager 4100 receive the request from the job manager 4040. When completing processing of the image data by RIP 2018, the processed images are deployed in the memory. The images on the memory (including character/photograph discrimination signal) are stored to the HDD 2004. As accompanying information to the images, the color/black-and-white information is stored in SRAM, the PDF images are stored as the image input origin, and color space CMYK or RGB are also stored.

At the time of completion of storing the PDL images in HDD 2004, the storage completion notification is received from the sync manager 4080 and notified to PDL Application 4023 via the common interface 4030. The PDL application 4023 notifies Network Application 4420 and HDD of the storage completion after the notification, and the information is transferred to the host PC into which the PDL print is input. In PDL print job, the PDL manager 4070 and the print manager execute printing on the printer section 2017 on the basis of the images deployed on the memory.

In printing of the images deployed and stored in PDL, the stored document to which printing direction is provided by the operation section 2006 are issued to BOX Application 4023 as a print job. While BOX Application 4023 inputs the print job to the job manager 4040 via the common interface 4030. Differently from local-copying, instead of the scan manager 4050, the file read manager 4060 receives the request from the job manager 4040 and carries out the request for deploying the images to which printing direction is given to a memory from HDD to the image manager 4110 via the sync manager 4080. The operations after that are similar to the operations described for the print job of remote-copying.

For the switching control of four color printing or six color printing of the printer regarding the description of the present embodiment in the printing system described above, a plurality of embodiments according to the present invention are described below. Though in those embodiments, switching control in the printer 200 is described as an example, it should be noted that the same control as described below can be also applied to other printing devices having similar structures to other printers 220, 230.

First Embodiment

Figure 15:
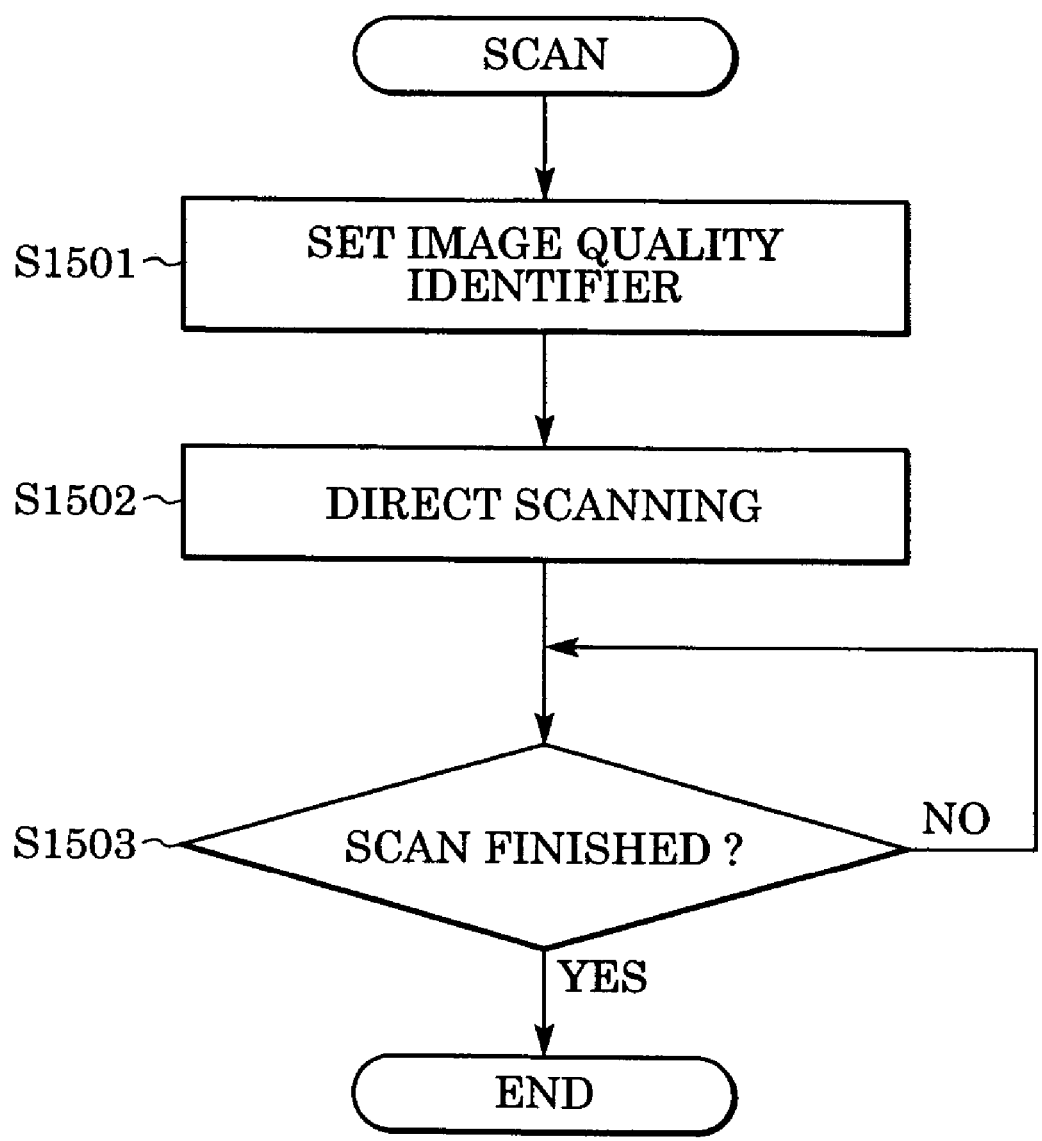
FIG. 15 is a flowchart illustrating the process outline by a scan manager 4050 in scanning.
Figure 16:
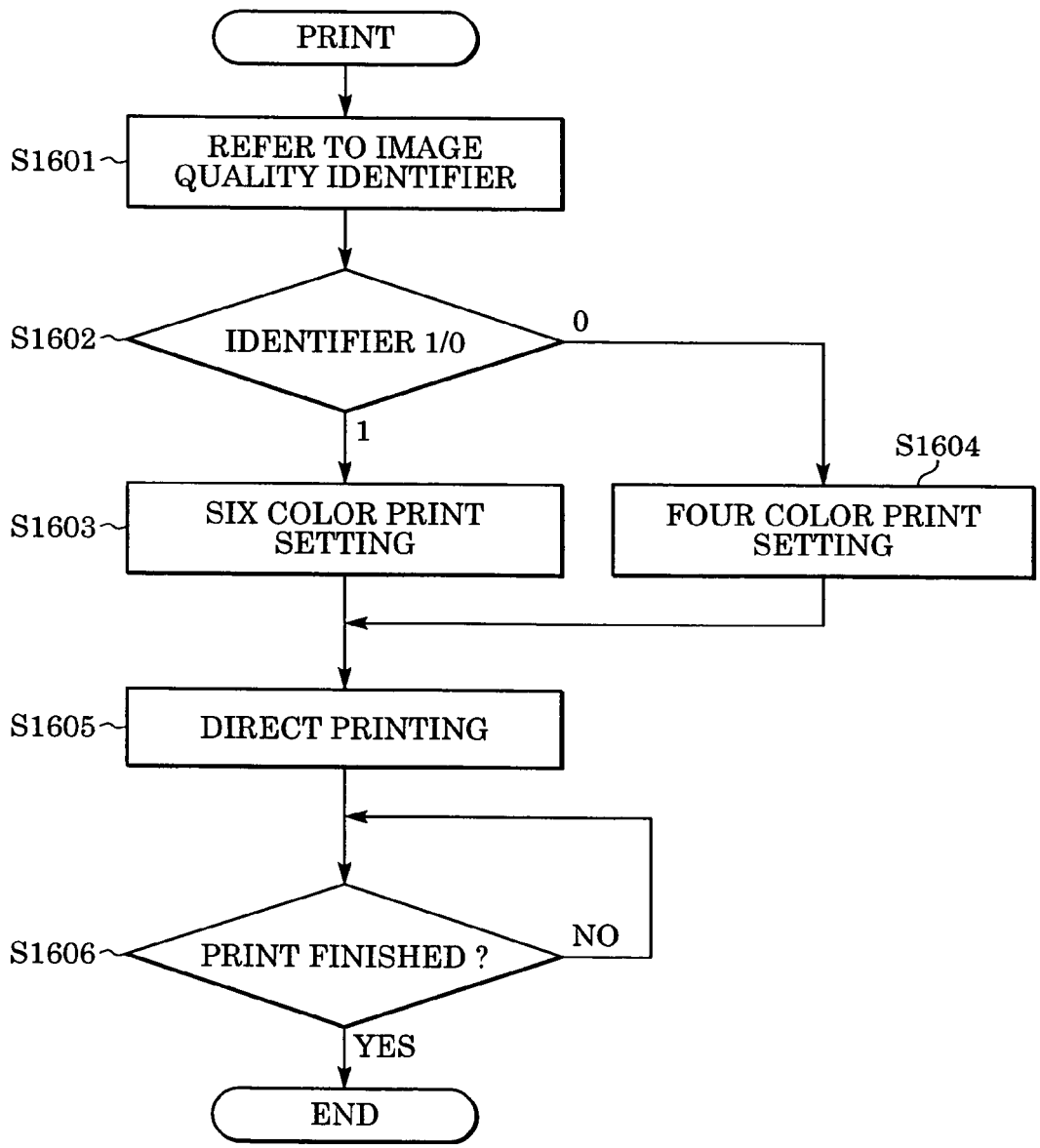
FIG. 16 is a flowchart illustrating the process outline by a print manager 4090 in printing.

A first embodiment according to the present invention relates to the control for carrying out six color printing or four color printing according to the property of a scanner regarding reading of images corresponding to the property of the image data and affecting the print quality. FIG. 15 is a flowchart illustrating the process by a scan manager 4050 in scanning; and FIG. 16 is a flowchart illustrating the process by a print manager 4090 in printing. Referring to these drawings, execution of six color printing or four color printing according to the property of the scanner is described below.

In scan processing for reading out the original image by a scan job of local-copying or remote-copying, as shown in FIG. 15, a scan manager 4050 first directs setting of a scanner image processing section 2014 to an image manager 4110. This means that setting of the scanner image processing section 2014 is carried out via packet data creation processing by a compaction section 2012. The setting is carried out for the compaction section 2012 according whether the scanner section is in the CCD technique or in the CIS technique, and the compaction section 2012 sets the image quality identifier of input image identification information in a packet header according to the above setting when creating packet images from raster images (Step S1501). Thus, the information is recorded in the packet header regardless of whether the read out images are images with relatively high quality read out by the CCD technique scanner or images with relatively low quality read out by the CIS technique. More particularly, when using the scanner section 2015 of a printer 200 including the CCD technique scanner or the scanner section 2270 of a printer 220, the image quality identifier would be '1' and when using the scanner section 2370 of a printer 230 comprising the CIS technique scanner, the image quality identifier would be '0'. A scan manager 4050 directs scanning to the scanner section after the setting (Step S1502), and when the scanning is completed (Step S1503), the scan manager 4050 notifies a job manager 4040 of the scanning completion and then the processing ends.

In printing process executed by the print jobs of local-copying or remote-copying, as shown in FIG. 16, the print manager first directs setting of the printer image processing section 2016 to the image manager 4110. At that time, in addition to the accompanying information of the images, an image quality identifier of input image identification information is referred to in the packet header of the image data (Step S1601). Then, it is determined whether the image quality identifier referred to as shown above is '1' or '0' (Step S1602). When the image quality identifier is '1' indicating high-quality image, six color printing is set (Step S1603). When the image quality identifier is '0' indicating low-quality image, four color printing is set (Step S1604). Thus, six color printing is executed for images read out by a scanner in the CCD technique while four color printing is executed for images read out by a scanner in the CIS technique.

After that, a print manager 4090 directs printing to the printer section (Step S1605), and when the printing is completed (Step S1606), the print manager 4090 notifies the job manager 4040 of the printing completion and then the processing ends.

As described above, in the present embodiment, as the correspondence to the property of image data and affecting the printing quality, the property of the scanner regarding reading out of the image is used and accordingly six color printing or four color printing is switched, and the determination of whether the image is suitable for six color printing or insufficiently realizable up to the same level as when using six color printing can be indicated from the property of the scanner or simple identification information of the kind of the scanner.

It should also be noted that setting of the above-described image quality identifier and printing operations based on the setting can be controlled similarly even in local-copying or remote-copying by other printers in the present printing system. For example, in the printer 220, in local-copying of the images read out by the scanner section 2270 as the CCD-technique scanner section being printed using the printer section by the controller 2200 or in remote-copying of the same image data being transmitted to the printer 230 via the network and being printed out using the printer 2395 by the controller 2300, printing can be carried out by the similar control method. In such a case, in both the printers, six color printing is carried out. When the images read out by a scanner section 2370 as the CIS-technique scanner section are printed out by the printer 2395 (local-copying) and when the images are printed out by the printer section 2017 of the printer 200 (remote-copying), both the cases are also similar. In such a case, in both the printers, four color printing is carried out.

By controlling in such manners, it can be switched to carry out six color printing when the images read out by the scanner capable of reading out high quality images such as in the CCD technique and four color printing when the images read out by the scanner capable of reading out relatively low quality images such as in the CIS technique, and accordingly printing using the set of toners suitable to the images to be printed out without bothering the user and without wasting the toners.

Second Embodiment

The first embodiment describes a control method for setting the input image identification information so as to execute four color printing mode or six color printing mode when printing out the read out images according to the reading quality provided to the scanner and for switching the above-mentioned printing mode according to the set input image identification information and executing in the scan job and print job in local-copying or remote-copying. The second embodiment, regardless of the scan job and print job in local-copying or remote-copying, relates to setting input image identification information similarly to the first embodiment according to the scanner for the images to be printed out, input by the scanner and switching to four color printing or six color printing by referring to the identification information.

Following are descriptions regarding switching of four color printing or six color printing in printing of received fax images as example.

When transmitting the fax images, similarly to scanning by the copy job or scan job of remote-copying, in scanning for fax, an image manager 4110 sets a scanner image processing section 2014. At that time, setting of Compaction 2012 is changed according to that the scanner section having read out the fax images should be in the CCD technique or in the CIS technique, Compaction 2012 switches the image quality identifier of the input image identification information on the packet header when creating packet images from raster images according to the above setting, and it is recorded in the packet header whether the image is a high quality image read out using the CCD or low quality image read out by the CIS. More particularly, the image quality identifier would be '1' when using the CCD technique scanner sections 2070, 2270 and it would be '0' when using the CIS technique scanner section 2370.

The image is stored in HDD by a store manager having received the request from the job manager. Then, transmission is directed to a fax manager 4041 from Transmission Application 4021 via the common interface 4030 and the job manager 4040. In response to the direction, the fax manager 4041 negotiates with the counterpart equipment via a modem 2050, requests the image manager 4110 of required image processing (rotation, variable power) and transmits the converted images using the modem.

When receiving the transmission, the fax manager receives the images using the modem and stores them in HDD 2004 as image files. After that, similarly to the print job of remote-copying as described in the first embodiment, by referring to the image quality identifier, four color printing or six color printing is automatically switched.

In the present embodiment, though the example of a fax transmitting and receiving the images picked up by the scanner using a modem via a pay station line was described, it should be noted that switching control can be carried out even when using standard file transfer protocol such as FTP, SMB and transmitting/receiving via a network.

Third Embodiment

In the above-described first and second embodiments, the correspondence to the property affecting the printing quality is that of a scanner having picked up the image data to be printed out. In the third embodiment, as the correspondence to the property of the image data and affecting the printing quality, the kind of PDL language is used. Or, according to the kind of PDL language for describing the images to be printed out, the input image identification information is set and by referring to the input image identification information, four color printing or six color printing is switched for printing.

More particularly, when carrying out PDF data deployment and storage job, the request from the host PC 240 to which PDL printing is input is transferred to PDL Application 4023 via Network Application 4120. Then, PDL Application 4023 directs the PDL data deployment and storage job to the job manager 4040 via the common interface 4030. In response to the direction, the job manager 4040 requests the PDL manager 4070 and the store manager 4100 of processing regarding printing. Image input after completion of predetermined processing of the images by RIP 2018 is similar to that of the scan job as described above.

Or, when the images on the memory (including character/photograph discrimination signal) are stored in HDD 2004, the store manager 4100 carries out setting to Compaction 2012. At that time, according to the image quality of the PDL images, the setting of Compaction 2012 is changed. In the present embodiment, the image quality identifier is switched according to the kind of PDL language before deployment. More particularly, when describing using the PostScript® language of Adobe®, Inc., the image quality identifier would be '1' and it would be '0' when using other languages. Compaction 2012 switches the image quality identifier of the input image identification information on the packet header when creating packet images from raster images according to the above setting, and it is recorded in the packet header whether or not the image is high quality image described in the PostScript® language.

The PostScript® language of Adobe®, Inc. has the advantages in environment improvement regarding color reproducibility compared to other languages such that a variety of software for adjusting color reproducibility such as color calibration is prepared, that profiles for PostScript® according to printers (data describing printer property) are prepared by manufactures of the printers, and that software for creating profiles is prepared. In the present embodiment, it is assumed that the profiles for PostScript® are prepared when carrying out six color printing using a printer while those for other languages are not prepared. In such a case, the image data described in languages other than PostScript® is not considered to have high quality and not to be suitable to six color printing, and four color printing is applied instead.

When the images on the memory (including character/photograph discrimination signal) is stored in HDD 2004, the PDL images and color space CMYK or RGB are also stored in SRAM (not shown) as the accompanying information of the images as the color/black-and-white information and the image input origin, too. At the time of completion of storing of the PDL images in HDD 2004, the storage completion notification is received from the sync manager 4080 and notified to PDL Application 4023 via the common interface 4030. The PDL application 4023 notifies Network Application 4420 and HDD of the storage completion after the notification, and the information is transferred to the host PC into which the PDL print was input. In the PDL print job, the PDL manager 4070 and the print manager execute printing on the basis of the images deployed on the memory.

In printing of the images deployed and stored in PDL, the stored document to which printing direction is provided by the operation section 2006 are issued to PDL Application 4023 as the print job. Or, BOX Application 4022 inputs the print job to the job manager 4040 via the common interface 4030. Then, the file read manager 4060 receives the request from the job manager 4040 and carries out the request for deploying the images to which printing direction is given to a memory from HDD to the image manager 4110 via the sync manager 4080.

While the image manager 4110 carries out setting of the printer image processing section 2016. At that time, in addition to the accompanying information of the images, the image quality identifier of input image identification information on the packet header of the image data is referred to and according to the contents of the identifier, setting of the printer image processing section 2016 is switched. Or, when the image quality identifier is '1' indicating high quality image, setting of six color printing is carried out according to the prepared profiles and when it is '0' indicating low quality image, setting of four color printing is carried out. Thus, for the images initially described in the PostScript® language, six color printing would be carried out, and for the images described in other languages, four color printing would be carried out.

In the present embodiment, an example was described for switching to six color printing or four color printing according to the language used in the description; it would also be possible to switch according to the color space information (CMYK or other) for example. This is because the image data initially indicated in the CMYK color space by a user is considered to be more oriented toward improvement in color reproducibility and high quality printing. Generally, the image data indicated in the CMYK color space is more oriented toward high quality printing than the image data indicated in the RGB color space, that is, the image data converted into the color space to be actually used for printing by the user himself or herself in spite of depending on the conversion logic initially provided to the printer is considered to be more oriented.

Fourth Embodiment

In the above-described first, second and third embodiments, the contents of the image quality identifier of input image identification information of the packet header is set when inputting the images, and by referring to the contents when printing, four color printing or six color printing is automatically switched. In the fourth embodiment, even in a job for printing out the images stored in HDD, which is called box printing, the above-described image quality identifier is set when accumulating the images in HDD, and accordingly, four color printing or six color printing is switched.

Setting of the image quality identifier is carried out similarly to the first or third embodiment, and processing for automatically switching to four color printing or six color printing is carried out similarly to that of the job print of remote-copying described in the first embodiment.

Fifth Embodiment

In a fifth embodiment according to the present invention, using the input origin equipment identifier of the input image identification information in the packet header instead of the above-described image quality identifier, switching to four color printing or six color printing is carried out.

As shown in FIG. 4, the packet header in the packet image data structure includes the input origin equipment identifier as information for identifying an input source other than the image quality identifier. In the present embodiment, there are two identifiers: one for indicating the data from scanning as the input source and the other for indicating the data PDL-deployed from the host PC.

When scanning in local-copying and carrying out the scan job in remote-copying, the image manager 4110 carries out setting of the scanner image processing section 2014. At that time, setting for Compaction 2012 is changed and when Compaction 2012 creates packet images from raster images, setting of input origin equipment identifier of input image identification information on the packet header is carried out. Or, the input origin equipment identifier indicating the scanner input image is set to be '1'. When carrying out the PDL data deployment and storage job, in storing the images deployed on the memory are stored in HDD 2004, the store manager 4100 changes setting for Compaction 2012, and when Compaction 2012 creates packet images from raster images, the input origin equipment identifier indicating the deployed PDL data from the host PC of the input origin equipment identifiers of input image identification information in the packet header is set to be '1'.

As described above, the set input origin equipment identifier is referred to when printing out by a printer, and according to the contents, four color printing or six color printing is carried out. In the present embodiment, when the contents of the above two input origin identifiers are respectively '1', six color printing is carried out and when it is '0', four color printing is carried out.

Other Embodiments

In other embodiments according to the present invention, it would be also possible to carry out four color printing or six color printing according to the combination of the image quality identifier and input origin equipment identifier by referring both the identifiers in the above-described packet header. For example, when there is not a large difference in affecting the printing quality among the images with the same PDL images but different description languages, six color printing is normally carried out in printing out on the basis of the PDL deployment images, and when printing images by scanning, six color printing is carried out if the images are read out by the CCD technique scanner and four color printing is carried out if the images are read out by the CIS technique scanner.

In the above-described embodiment, though an example of the combination of toners using thinner concentration toners for cyan and magenta in addition to normal cyan, magenta, yellow and black, the combination of recording agents to be used is described, the present invention is not limited to this case. For example, it would also be possible to use the combination of toners with different concentrations for colors other than cyan or magenta as described above. It would also be possible to use the combination using spot colors such as green, blue, and red instead of using toners with different concentrations.

Application of the present invention is not limited to an electrophotographic type printing device as described above but it can be also applied other types of providers, for example, to an ink jet type printing device.

Further Other Embodiments

The present invention can also be applied to a system having of a plurality of equipment (for example, host computer, interface equipment, reader, printer, etc.) or to a device having of one equipment (for example, copier, facsimile machine)

A case in which program code (software) for realizing the above-described embodiments is provided to a device or a computer in the system, which are connected to various kinds of devices so as to operate various kinds of devices in order to realize the embodiments described in FIGS. 15 and 16 and that the various kinds of devices are operated according to the program stored in the computer of the system or the device (CPU or MPU (micro-processing unit)) would be also included in the scope of the present invention.

In such a case, the program code itself of the above software realizes the functions of the above-described embodiments, and thus the program code itself and a means for providing the program code to the computer, for example a storage medium storing such a program code constitutes the present invention.

The storage medium for storing such program code, may be for example, floppy disc, hard disc, optical disc, magneto-optical disc, CD-ROM (compact disk-read-only memory), magnetic tape, non-volatile memory card, ROM, etc.

Not only can the functions of the above-mentioned embodiments be realized, but also the functions can be realized by co-operation of the program code together with the OS (operating system) operated in the computer or other application software.

A function expanded board of a computer or function expanded unit connected to the computer may execute partly or entirely actual processing on the basis of the direction of the provided program code after storing of the program code in a memory provided to the function expanded board or the function expanded unit and by the processing, the functions of the above-mentioned embodiments can be realized.

In the above structure, as the correspondence to the property of image data and affecting the printing quality, for example, the ability of reading equipment such as a scanner regarding reading out of the image or the kind of language for describing the image data is used and accordingly, six color printing or four color printing is selected for printing, and the determination of whether the image is suitable for six color printing or insufficiently realizable up to the same level when using six color printing can be indicated by simple identification information such as the kind of the scanner or the kind of language for describing the image data.

As a result, switching of the set of recording agents such as switching to six color printing or four color printing can be carried out without bothering the user and the set of recording agents suitable to the images to be printed out can be selected.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-055370 filed Feb. 27, 2004, which is hereby incorporated by reference herein.

What is claimed is:

1. An image forming device comprising:
    determination means for determining whether information indicating a quality of an input image is first information or second information, the second information indicating that the input image has a lower quality than a quality indicated by the first information;
    setting means for setting a combination of recording agents, used for forming the input image on a sheet, to a first combination when the determination means determines that the information indicating the quality of the input image is the first information, and setting the combination of the recording agents, used for forming the input image on the sheet, to a combination of the recording agents having the smaller number of recording agents than the number of recording agents of the first combination when the determination means determines that the information indicating the quality of the input image is the second information; and
    image forming means for forming the input image on the sheet using the combination of the recording agents set by the setting means.

2. The image forming device according to claim 1, further comprising secondary setting means for setting the information indicating the quality of the input image corresponding to a type of sensor of reading equipment for reading the input image.

3. The image forming device according to claim 2, wherein
the type of sensor of the reading equipment includes a CCD and a CIS, and
the second setting means sets the information indicating the quality of the input image to the first information when the sensor of the reading equipment for reading the input image is the CCD, and sets the information indicating the quality of the input image to the second information when the sensor of the reading equipment for reading the input image is the CIS.

4. An image forming device comprising:
determination means for determining whether a type of language for describing an input image is a first type or a second type, the second type reproducing the input image with a lower image quality than an image quality given by the first type;
setting means for setting a combination of recording agents, used for forming the input image on a sheet, to a first combination when the determination means determines that the type of language for describing the input image is the first type, and setting the combination of the recording agents, used for forming the input image on the sheet, to a combination of the recording agents having the smaller number of recording agents than the number of recording agents of the first combination when the determination means determines that the type of language for describing the input image is the second type; and
image forming means for forming the input image on the sheet using the combination of the recording agents set by the setting means.

5. An image forming device comprising:
determination means for determining whether a color space of an input image is CMYK or RGB;
setting means for setting a combination of recording agents, used for forming the input image on a sheet, to a first combination when the determination means determines that the color space of the input image is the CMYK, and setting the combination of the recording agents, used for forming the input image on the sheet, to a combination of the recording agents having the smaller number of recording agents than the number of recording agents of the first combination when the determination means determines that the color space of the input image is the RGB; and
image forming means for forming the input image on the sheet using the combination of the recording agents set by the setting means.

6. An image forming method comprising the steps of:
a determination step for determining whether information indicating a quality of an input image is first information or second information, the second information indicating that the input image has a lower quality than a quality indicated by the first information;
a setting step for setting a combination of recording agents, used for forming the input image on a sheet, to a first combination when it is determined that the information indicating the quality of the input image is the first information in the determination step, and setting the combination of the recording agents, used for forming the input image on the sheet, to a combination of the recording agents having the smaller number of recording agents than the number of recording agents of the first combination when it is determined that that the information indicating the quality of the input image is the second information in the determination step; and
an image forming step for forming the input image on the sheet using the combination of the recording agents set in the setting step.

7. The image forming method according to claim 6, further comprising a secondary setting step for setting the information indicating the quality of the input image corresponding to a type of sensor of reading equipment for reading the input image.

8. The image forming method according to claim 7, wherein
the type of sensor of the reading equipment includes a CCD and a CIS, and
in the second setting step, the information indicating the quality of the input image is set to the first information when the sensor of the reading equipment for reading the input image is the CCD, and sets the information indicating the quality of the input image to the second information when the sensor of the reading equipment for reading the input image is the CIS.

9. An image forming method comprising the steps of:
a determination step for determining whether a type of language for describing an input image is a first type or a second type, the second type reproducing the input image with a lower image quality than an image quality given by the first type;
a setting step for setting a combination of recording agents, used for forming the input image on a sheet, to a first combination when it is determined that the type of language for describing the input image is the first type in the determination step, and setting the combination of the recording agents, used for forming the input image on the sheet, to a combination of the recording agents having the smaller number of recording agents than the number of recording agents of the first combination when it is determined that the type of language for describing the input image is the second type in the determination step; and
an image forming step for forming the input image on the sheet using the combination of the recording agents set in the setting step.

10. An image forming method comprising the steps of:
a determination step for determining whether a color space of an input image is CMYK or RGB;
a setting step for setting a combination of recording agents, used for forming the input image on a sheet, to a first combination when it is determined that the color space of the input image is the CMYK in the determination step, and setting the combination of the recording agents, used for forming the input image on the sheet, to a combination of the recording agents having the smaller number of recording agents than the number of recording agents of the first combination when it is determined that the color space of the input image is the RGB in the determination step; and
an image forming step for forming the input image on the sheet using the combination of the recording agents set in the setting step.

11. A computer-readable recording medium storing a computer program, being operable on a computer to execute the steps of the method according to claim 6.

12. A computer-readable recording medium storing a computer program, being operable on a computer to execute the steps of the method according to claim 7.

13. A computer-readable recording medium storing a computer program, being operable on a computer to execute the steps of the method according to claim 8.

14. A computer-readable recording medium storing a computer program, being operable on a computer to execute the steps of the method according to claim 9.

15. A computer-readable recording medium storing a computer program, being operable on a computer to execute the steps of the method according to claim 10.

* * * * *